US009452402B2

(12) United States Patent
Tonkovich et al.

(10) Patent No.: US 9,452,402 B2
(45) Date of Patent: *Sep. 27, 2016

(54) INTEGRATED REACTORS, METHODS OF MAKING SAME, AND METHODS OF CONDUCTING SIMULTANEOUS EXOTHERMIC AND ENDOTHERMIC REACTIONS

(71) Applicant: Battelle Memorial Institute, Richland, WA (US)

(72) Inventors: Anna Lee Tonkovich, Gilbert, AZ (US); Gary Roberts, West Richland, WA (US); Steven T. Perry, Galloway, OH (US); Sean P. Fitzgerald, Columbus, OH (US); Robert S. Wegeng, Richland, WA (US); Yong Wang, Richland, WA (US); David Vanderwiel, Pelissanne (FR); Jennifer L. Marco, South Charleston, OH (US)

(73) Assignee: Battelle Memorial Institute, Richland, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/053,500

(22) Filed: Oct. 14, 2013

(65) Prior Publication Data
US 2014/0134547 A1    May 15, 2014

Related U.S. Application Data

(60) Continuation of application No. 12/891,800, filed on Sep. 27, 2010, now Pat. No. 8,557,186, which is a continuation of application No. 11/232,485, filed on Sep. 21, 2005, now Pat. No. 7,803,325, which is a
(Continued)

(51) Int. Cl.
*B01J 19/00* (2006.01)
*B01J 19/24* (2006.01)
(Continued)

(52) U.S. Cl.
CPC .............. *B01J 8/0285* (2013.01); *B01J 12/007* (2013.01); *B01J 19/0093* (2013.01);
(Continued)

(58) Field of Classification Search
CPC ........ B01J 10/00; B01J 10/007; B01J 12/00; B01J 12/007; B01J 14/00; B01J 14/005; B01J 15/00; B01J 15/005; B01J 16/00; B01J 16/005; B01J 19/00; B01J 19/0093; B01J 19/24; B01J 19/248; B01J 19/249; B01J 2008/00; B01J 2008/00008; B01J 2008/00017; B01J 2008/00106; B01J 2008/0015; B01J 2219/00; B01J 2219/00051; B01J 2219/00074; B01J 2219/00076; B01J 2219/00085; B01J 2219/00781–2219/00788; B01J 2219/00801; B01J 2219/00804; B01J 2219/00819–2219/00844; B01J 2219/00867; B01J 2219/00869; B01J 2219/00871; B01J 2219/00873; B01J 2208/00; B01J 2208/00008; B01J 2208/00017; B01J 2208/00106; B01J 2208/0015; C01B 3/00; C01B 3/02; C01B 3/32; C01B 3/38–3/384; C01B 2203/00–2203/0205; C01B 2203/0227; C01B 2203/025; C01B 2203/0283; C01B 2203/08–2203/0811; C01B 3/34
See application file for complete search history.

(56) References Cited

U.S. PATENT DOCUMENTS 4,401,155 A    8/1983    Royal et al.
4,850,705 A    7/1989    Horner
(Continued)

FOREIGN PATENT DOCUMENTS

DE    19841993    3/2000
JP    07-245112    9/1995
(Continued)

OTHER PUBLICATIONS

English translation of SU 1383080A, provided in notice of references cited filed on Apr. 6, 2015 and published Mar. 23, 1988.*
(Continued)

*Primary Examiner* — Natasha Young
(74) *Attorney, Agent, or Firm* — Frank Rosenberg

(57) ABSTRACT

Integrated Combustion Reactors (ICRs) and methods of making ICRs are described in which combustion chambers (or channels) are in direct thermal contact to reaction chambers for an endothermic reaction. Superior results were achieved for combustion chambers which contained a gap for free flow through the chamber. Particular reactor designs are also described. Processes of conducting reactions in integrated combustion reactors are described and results presented. Some of these processes are characterized by unexpected and superior results.

16 Claims, 31 Drawing Sheets

Related U.S. Application Data division of application No. 10/076,875, filed on Feb. 14, 2002, now Pat. No. 6,969,506, which is a continuation-in-part of application No. 09/640,903, filed on Aug. 16, 2000, now Pat. No. 6,680,044, which is a continuation-in-part of application No. 09/375,614, filed on Aug. 17, 1999, now Pat. No. 6,488,838.

(60) Provisional application No. 60/269,628, filed on Feb. 16, 2001.

(51) Int. Cl.

| | | |
|---|---|---|
| *B01J 10/00* | (2006.01) | |
| *B01J 12/00* | (2006.01) | |
| *B01J 14/00* | (2006.01) | |
| *B01J 15/00* | (2006.01) | |
| *B01J 16/00* | (2006.01) | |
| *C01B 3/38* | (2006.01) | |
| *B01J 8/02* | (2006.01) | |
| *C01B 3/50* | (2006.01) | |
| *C01B 13/02* | (2006.01) | |
| *F23C 13/00* | (2006.01) | |
| *F23N 1/00* | (2006.01) | |
| *C01B 3/00* | (2006.01) | |
| *C01B 3/02* | (2006.01) | |
| *C01B 3/32* | (2006.01) | |
| *C01B 3/34* | (2006.01) | |
| *H01M 8/06* | (2016.01) | |

(52) U.S. Cl.
CPC .............. *B01J 19/249* (2013.01); *C01B 3/38* (2013.01); *C01B 3/384* (2013.01); *C01B 3/501* (2013.01); *C01B 13/0251* (2013.01); *F23C 13/00* (2013.01); *F23N 1/007* (2013.01); *B01J 2208/00309* (2013.01); *B01J 2219/0086* (2013.01); *B01J 2219/00783* (2013.01); *B01J 2219/00822* (2013.01); *B01J 2219/00824* (2013.01); *B01J 2219/00833* (2013.01); *B01J 2219/00835* (2013.01); *B01J 2219/00844* (2013.01); *B01J 2219/00873* (2013.01); *B01J 2219/00891* (2013.01); *B01J 2219/247* (2013.01); *B01J 2219/2453* (2013.01); *B01J 2219/2458* (2013.01); *B01J 2219/2459* (2013.01); *B01J 2219/2465* (2013.01); *B01J 2219/2471* (2013.01); *B01J 2219/2474* (2013.01); *B01J 2219/2475* (2013.01); *B01J 2219/2479* (2013.01); *B01J 2219/2482* (2013.01); *B01J 2219/2497* (2013.01); *B01J 2219/2498* (2013.01); *C01B 2203/0233* (2013.01); *C01B 2203/0244* (2013.01); *C01B 2203/0261* (2013.01); *C01B 2203/0283* (2013.01); *C01B 2203/041* (2013.01); *C01B 2203/0495* (2013.01); *C01B 2203/0811* (2013.01); *C01B 2203/0822* (2013.01); *C01B 2203/0827* (2013.01); *C01B 2203/0833* (2013.01); *C01B 2203/0844* (2013.01); *C01B 2203/0883* (2013.01); *C01B 2203/1005* (2013.01); *C01B 2203/1029* (2013.01); *C01B 2203/1035* (2013.01); *C01B 2203/1041* (2013.01); *C01B 2203/1064* (2013.01); *C01B 2203/1076* (2013.01); *C01B 2203/1082* (2013.01); *C01B 2203/1205* (2013.01); *C01B 2203/1241* (2013.01); *C01B 2203/1276* (2013.01); *C01B 2203/1288* (2013.01); *C01B 2203/141* (2013.01); *C01B 2203/142* (2013.01); *C01B 2203/148* (2013.01); *C01B 2203/1604* (2013.01); *C01B 2203/169* (2013.01); *C01B 2203/1619* (2013.01); *C01B 2203/1633* (2013.01); *C01B 2203/1652* (2013.01); *C01B 2203/1676* (2013.01); *C01B 2203/1695* (2013.01); *C01B 2203/82* (2013.01); *H01M 8/0631* (2013.01); *Y02P 20/128* (2015.11); *Y02P 70/56* (2015.11); *Y10T 29/49826* (2015.01)

(56) References Cited

U.S. PATENT DOCUMENTS

| | | |
|---|---|---|
| 4,859,642 A | 8/1989 | Hoelderich et al. |
| 5,023,276 A | 6/1991 | Yarrington et al. |
| 5,047,381 A | 9/1991 | Beebe |
| 5,227,256 A * | 7/1993 | Marianowski et al. ...... 429/423 |
| 5,270,127 A | 12/1993 | Koga et al. |
| 5,309,637 A | 5/1994 | Moriarty |
| 5,366,719 A | 11/1994 | van Wingerden |
| 5,518,697 A | 5/1996 | Dalla Betta et al. |
| 5,565,009 A | 10/1996 | Ruhl et al. |
| 5,609,834 A | 3/1997 | Hamada et al. |
| 5,811,062 A | 9/1998 | Wegeng et al. |
| 6,056,932 A | 5/2000 | Von Hippel et al. |
| 6,117,578 A | 9/2000 | Lesieur |
| 6,142,477 A | 11/2000 | Meinzer |
| 6,159,358 A | 12/2000 | Mulvaney |
| 6,200,536 B1 | 3/2001 | Tonkovich et al. |
| 6,241,875 B1 | 6/2001 | Gough |
| 6,274,101 B1 | 8/2001 | Sechrist |
| 6,294,138 B1 | 9/2001 | Von Hippel et al. |
| 6,482,375 B1 | 11/2002 | van der Wal |
| 6,488,838 B1 | 12/2002 | Tonkovich et al. |
| 6,540,975 B2 | 4/2003 | Tonkovich et al. |
| 6,680,044 B1 | 1/2004 | Tonkovich et al. |
| 6,936,237 B2 | 8/2005 | Tonkovich et al. |
| 6,969,506 B2 | 11/2005 | Tonkovich |
| 7,014,835 B2 | 3/2006 | Mathias et al. |
| 7,288,231 B2 | 10/2007 | Tonkovich et al. |
| 7,803,325 B2 | 9/2010 | Tonkovich et al. |
| 2001/0040025 A1 | 11/2001 | Jurisich |
| 2002/0110932 A1 | 8/2002 | Wagner et al. |

FOREIGN PATENT DOCUMENTS

| | | |
|---|---|---|
| SU | 1383080 A * | 3/1988 |
| WO | WO 96/32188 A1 * | 4/1996 |
| WO | WO00 13783 | 3/2000 |
| WO | 2000/034728 | 6/2000 |
| WO | WO00 03728 | 6/2000 |

OTHER PUBLICATIONS

Official Action from BR Patent Application PI 0207276-9 dated Jul. 10, 2012.

Decision on Appeal dated Jan. 22, 2013 in Appeal 2012-012339 before the USPTO Patent Trial and Appeals Board.

Decision on Appeal dated Nov. 25, 2015 in Appeal 2012-012339 before the USPTO Patent Trial and Appeals Board.

Schubert K. et al., "Realization and testing of microstructure reactors, microheat exchangers and micromixers for industrial applications in chemical engineering", The American Institute of Chemical Engineers (AIChe) Spring Meeting, New Orleans, Mar. 9-12, 1998, pp. 88-95.

Tonkovich, Anna Lee Y et al., The Catalytic Partial Oxidation of Methane in a Microchannel Chemical Reactor, The American Institute of Chemical Engineers (AIChe) Spring Meeting, New Orleans, Mar. 9-12, 1998, pp. 45-53.

* cited by examiner

INTEGRATED REACTORS, METHODS OF MAKING SAME, AND METHODS OF CONDUCTING SIMULTANEOUS EXOTHERMIC AND ENDOTHERMIC REACTIONS

RELATED APPLICATIONS

This application is a continuation of U.S. patent application Ser. No. 12/891,800, now U.S. Pat. No. 8,557,186, filed Sep. 27, 2010, which was a continuation of U.S. patent application Ser. No. 11/232,485, now U.S. Pat. No. 7,803,325, which was a divisional of U.S. patent application Ser. No. 10/076,875, now U.S. Pat. No. 6,969,506, which was a continuation-in-part of U.S. patent application Ser. No. 09/375,614, now U.S. Pat. No. 6,488,838 and Ser. No. 09/640,903, now U.S. Pat. No. 6,680,044, which are incorporated herein as if reproduced in full below. In accordance with 35 U.S.C. sect. 119(e), this application claims priority to U.S. Provisional Application No. 60/269,628, filed Feb. 16, 2001.

FIELD OF THE INVENTION

The present invention relates to integrated reactors for conducting exothermic and endothermic reactions, methods of making integrated reactors, and methods of conducting reactions in integrated reactors.

INTRODUCTION

Currently, endothermic reactions performed in microreactors are driven using heat from an external source, such as the effluent from an external combustor. In doing so, the temperature of the gas stream providing the heat is limited by constraints imposed by the materials of construction. For example, a typical microreactor constructed from Inconel 625 might be limited in use for gas service to temperatures of ~1050° C. or less. Practically, this means that the effluent from an external combustor must be diluted with cool gas (i.e. excess air) to bring the gas temperature down to meet material temperature constraints. This increases the total gas flow rate, raising blower/compressor costs. Moreover, heating the gas stream externally introduces heat losses (associated with delivery of the hot gas to the microreactor) and expensive high temperature materials to connect the combustor to the microreactor.

On the other hand, an integrated combustor can produce heat for the reaction in close proximity to the reaction zone, thus reducing heat losses and increasing efficiency. Because traditional combustion catalysts are not stable at high temperatures (above ~1200° C.) due to noble metal sintering, the integrated combustor must remove heat at a rate sufficient to keep local temperatures at the catalyst surface below this level or risk rapid catalyst deactivation.

SUMMARY OF THE INVENTION

In an integrated reactor, combustion/heat generation should occur in close proximity to the endothermic reaction. Preferably, an exothermic reaction occurs in microchannels that are interleaved with microchannels in which there is an endothermic reaction. Co-flow of endothermic and exothermic reaction streams is preferred; however, cross-flow or countercurrent flow is also an option. The heat of an exothermic reaction is conducted from the exothermic reaction catalyst to the endothermic reaction catalyst, where it drives the endothermic reaction. This rapid heat removal from the combustion region enables the option to use a very small fraction of excess air (e.g., close to stoichiometric combustion, which could produce temperatures exceeding 1400° C. if reacted adiabatically). The use of a flow-by catalyst configuration for one or both the exothermic and endothermic microchannels can create an advantageous capacity/pressure drop relationship. In a flow-by catalyst configuration, gas flows in a 0.05-2 mm gap adjacent to a thin layer of engineered catalyst that contacts the microchannel wall. The catalyst may be either inserted and adjacent to the reactor wall or integral with the reactor wall. In the case of integral with the reactor wall, a preferred method is washcoating a catalyst on a wall or walls of the microchannel. The catalyst may include the use of additional layers for increasing surface area, such as a porous high surface area ceramic, or layers for promoting adhesion of a ceramic to metal, such as amorphous titania that is either CVD or solution deposited. The use of channels having a minimum dimension of more than 2 mm may be less effective since heat and mass transfer limitations may be magnified. An integrated combustor can use the high surface area of microreactor channels to remove heat as it is produced, thus keeping microreactor components from exceeding material temperature constraints while combusting with much less excess air (or diluent) than would be necessary for an external combustor.

In one aspect, the invention provides an integrated reactor, that includes: a first reaction chamber having a width of 2 mm or less, where there is an open channel through the first reaction chamber, wherein the first reaction chamber has an internal volume comprising 5 to 95 vol. % of porous catalyst and 5 to 95 vol. % of open space. The integrated reactor also includes a second reaction chamber having a width of 2 mm or less, wherein there is an open channel through the second reaction chamber, wherein the second reaction chamber has an internal volume comprising a catalyst and at least 5 vol. % of open space; and a reaction chamber wall separating the first chamber and the second chamber. This intergrated reactor possesses a heat flux characteristic of at least 1 W/cc as measured according to the Heat Flux Measurement Test.

The invention also includes methods of performing exothermic and endothermic reactions in the reactor. An exothermic reaction composition is a chemical composition that will react under the selected conditions to produce heat; typically a catalyst will catalyze the reaction.

In another aspect, the invention provides an integrated reactor, that includes: a first reaction chamber having a width of 2 mm or less, wherein there is an open channel through the first reaction chamber, wherein the first reaction chamber has an internal volume comprising 5 to 95 vol. % of porous catalyst and 5 to 95 vol. % of open space; and a second reaction chamber having a width of 2 mm or less, wherein there is an open channel through the second reaction chamber, wherein the second reaction chamber has an internal volume comprising a catalyst and at least 5 vol. % of open space. A reaction chamber wall separates the first chamber and the second chamber; and the intergrated reactor possesses a $NO_x$ output characteristic of less than 100 ppm as measured according to the Standard $NO_x$ Test Measurement.

The invention also provides a method of making an integrated reactor, comprising: providing a single block of thermally conductive material; forming at least one first microchannel in the block; forming at least one second microchannel in the block; placing at least one catalyst capable of catalyzing an exothermic reaction in the at least one first microchannel; and placing at least one catalyst capable of catalyzing an endothermic reaction in the at least one second microchannel. In the integrated reactor, the first microchannel and second microchannel are separated by less than 1 cm.

The invention further provides a method of conducting an endothermic reaction in an integrated combustion reaction, comprising: passing an exothermically reacting composition into at least one exothermic reaction chamber, wherein the exothermic reaction chamber comprises at least one exothermic reaction chamber wall that is adjacent at least one endothermic reaction chamber, wherein the combustion chamber comprises a exothermic reaction catalyst in contact with at least the at least one exothermic reaction chamber wall that is adjacent at least one endothermic reaction chamber, wherein the exothermic reaction catalyst has an exposed surface within the exothermic reaction chamber, and wherein the exposed surface of the exothermic reaction catalyst and a second surface within the exothermic reaction chamber define an open channel within the exothermic reaction chamber, wherein the gap has a thickness, in a direction perpendicular to net flow where the direction of net flow is the direction that gas would travel through the combustion chamber during operation, of 2 mm or less; wherein the exothermic reaction composition reacts in the exothermic reaction chamber and generates heat; and passing an endothermic reaction mixture into the at least one endothermic reaction chamber; and wherein the method has a volumetric heat flux of at least 1 W/cc.

In another aspect, the invention provides a method of conducting an endothermic reaction in an integrated combustion reaction, comprising: passing an endothermic reaction composition into at least one endothermic reaction chamber, passing an exothermic reaction composition into at least one exothermic reaction chamber, wherein the exothermic reaction chamber comprises at least one exothermic reaction chamber wall that is adjacent at least one endothermic reaction chamber, wherein the endothermic reaction chamber comprises an endothermic reaction catalyst in contact with at least the at least one endothermic reaction chamber wall that is adjacent at least one exothermic reaction chamber, wherein the endothermic reaction catalyst comprises an exposed surface within the endothermic reaction chamber, and wherein the exposed surface of the endothermic reaction catalyst and a second surface within the endothermic reaction chamber define a gap within the endothermic reaction chamber, wherein the gap has a thickness, in a direction perpendicular to net flow where the direction of net flow is the direction that gas would travel through the endothermic chamber during operation, of 2 mm or less; and wherein the method is controlled such that heat flux between the at least one exothermic chamber and the at least one endothermic reaction chamber is 1 W/cc or more.

The invention also provides a method of conducting an endothermic reaction in an integrated combustion reaction, comprising: passing an endothermic reaction composition into at least one endothermic reaction chamber, passing an exothermic reaction composition into at least one exothermic reaction chamber, wherein the exothermic reaction chamber comprises at least one exothermic reaction chamber wall that is adjacent at least one endothermic reaction chamber, wherein the endothermic reaction chamber comprises an endothermic reaction catalyst in contact with at least the at least one endothermic reaction chamber wall that is adjacent at least one exothermic reaction chamber, wherein the endothermic reaction catalyst comprises an exposed surface within the endothermic reaction chamber, and wherein the exposed surface of the endothermic reaction catalyst and a second surface within the endothermic reaction chamber define a gap within the endothermic reaction chamber, wherein the gap has a thickness, in a direction perpendicular to net flow where the direction of net flow is the direction that gas would travel through the endothermic chamber during operation, of 2 mm or less; wherein the exothermic reaction composition comprises air and a fuel; and wherein the exothermic reaction composition is converted to products and the products have less than 100 ppm $NO_x$.

In another aspect (or in combination with any of the foregoing aspects), the present invention provides an integrated reactor including: at least one endothermic reaction chamber and/or at least one exothermic chamber, wherein at least one reaction chamber comprises at least one porous catalyst material and at least one open channel wherein each of the at least one (exothermic or endothermic) reaction chambers has an internal volume defined by reaction chamber walls in the direction of height and width, and by length of catalyst in the length direction. The internal volume has dimensions of chamber height, chamber width and chamber length. At least one exothermic reaction chamber and at least one endothermic reaction chamber (which is adjacent the exothermic reaction chamber) comprises a chamber height or chamber width that is about 2 mm or less. At a point where the chamber height or the chamber width is about 2 mm or less, the chamber height and the chamber width define a cross-sectional area. The cross-sectional area of at least one reaction chamber comprises a porous catalyst material and an open area, where the porous catalyst material occupies 5% to 95% of the cross-sectional area and where the open area occupies 5% to 95% of the cross-sectional area. The open area in the cross-sectional area occupies a contiguous area of $5\times10^{-8}$ to $1\times10^{-2}$ $m^2$ and the porous catalyst material has a pore volume of 5 to 98% and more than 20% of the pore volume comprises pores having sizes of from 0.1 to 300 microns.

The invention also includes devices having any of the unique structural features or designs described herein. For example, the invention includes apparatus that includes a fuel-air mixing manifold as shown in FIG. 19. The invention also includes processes using any of the structural features or designs, or characterized by any of the properties or results described herein.

Various embodiments of the present invention may possess advantages such as: low pressure drop, low requirement for excess air, high combustion stability, short contact time, low CO/NOx formation, operation at near stiochiometric air feed, greater safety, and high thermal cycling durability. Operation with a near stoichiometric air feed reduces the overall load on the systems air blower or compressor which will lead to significant cost savings.

An additional advantage by reducing the combustion temperature (or temperature of the exothermic reaction) required to drive the endothermic reaction is use of alternate metals or metallurgy such that lower cost materials or longer device life may be achieved.

Although the combustion may have both homogeneous and heterogeneous contributions, catalytic combustion in a microchannel (or channel with a minimum open dimension less than the quench diameter) will reduce the contribution of homogeneous reactions and favor heterogeneous (catalytic) combustion at the wall. This will also further enhance safety by inhibiting the gas phase reactions that might otherwise take the combustion mixture well above the safe operating temperature limit of the material. Inhibition grows stronger with decreasing channel minimum dimension and with increasing catalytic surface area on the channel walls.

In conjunction with other features of the invention, the use of a flow-by configuration in which a reaction chamber has a gap such that gases can flow by (rather than through) a catalyst allows for a significant improvement in performance over the prior art. This improved performance was evidenced in the integrated combustion reactor (ICR) tests by a much higher heat flux (e.g., 29 W/cm$^2$ on an area basis or 118 W/cm$^3$ on a volumetric basis) than any reported in the literature for a minimal pressure drop (e.g., <4 psi (0.3 bar) in a 1 inch reactor length. Because the ICR can achieve such high heat fluxes without causing excessive pressure drop, endothermic reaction contact times are feasible which are much shorter than those for flow-through catalytic devices or monolith devices. Shorter contact times enable a higher productivity or throughput through unit volume of reactor.

Introduction of laterally distributed (across a channel) combustion fuel and air in co-flow with endothermic reactant flow concentrates the heat transfer at the endothermic reactor inlet, where the concentration gradient (and therefore rate of reaction) is highest; thus obtaining superior results over systems that distribute the combustion fuel evenly over the entire surface of the combustion catalyst. Although the examples with distributed combustion still exhibit excellent heat flux in comparison to conventional steam reformers.

It is also recognized that the present invention could use alternate exothermic reactions, such as oxidation reactions, including partial oxidation reaction, to drive an endothermic reaction.

GLOSSARY

"Shims" refer to substantially planar plates or sheets that can have any width and height and preferably have a thickness (the smallest dimension) of 2 millimeter (mm) or less, and in some preferred embodiments between 50 and 500 µm.

"Unit operation" means chemical reaction, vaporization, compression, chemical separation, distillation, condensation, heating, or cooling. "Unit operation" does not mean merely mixing or fluid transport, although mixing and transport frequently occur along with unit operations.

A microchannel has at least one dimension of 2 mm or less.

An "open channel" is a gap of at least 0.05 mm that extends all the way through a reaction chamber such that gases can flow through the reaction chamber with relatively low pressure drop.

During operation, a reactant enters a combustion or reaction chamber in a bulk flow path flowing past and in contact with a "porous material" or "porous catalyst." A portion of the reactant molecularly transversely diffuses into the porous catalyst and reacts to form a product or products, and then the product(s) diffuses transversely into the bulk flow path and out of the reactor.

The term "bulk flow region" refers to open areas or open channels within the reaction chamber. A contiguous bulk flow region allows rapid gas flow through the reaction chamber without large pressure drops. In preferred embodiments there is laminar flow in the bulk flow region. Bulk flow regions within each reaction chamber preferably have a cross-sectional area of $5\times10^{-8}$ to $1\times10^{-2}$ m$^2$, more preferably $5\times10^{-7}$ to $1\times10^{-4}$ m$^2$. The bulk flow regions preferably comprise at least 5%, more preferably 30-80% of either 1) the internal volume of the reaction chamber, or 2) the cross-section of the reaction chamber.

"Equilibrium conversion" is defined in the classical manner, where the maximum attainable conversion is a function of the reactor temperature, pressure, and feed composition. For the case of hydrocarbon steam reforming reactions, the equilibrium conversion increases with increasing temperature and decreases with increasing pressure.

BRIEF DESCRIPTION OF THE FIGURES

FIG. 4b is an exploded view of an integrated reactor.

DETAILED DESCRIPTION OF THE INVENTION

An integrated reactor according to the present invention includes a first reaction chamber that contains a catalyst capable of catalyzing an exothermic reaction and an adjacent second reaction chamber that contains a catalyst capable of catalyzing an endothermic reaction. A reaction chamber wall separates the first and second reaction chambers.

Figure 1:
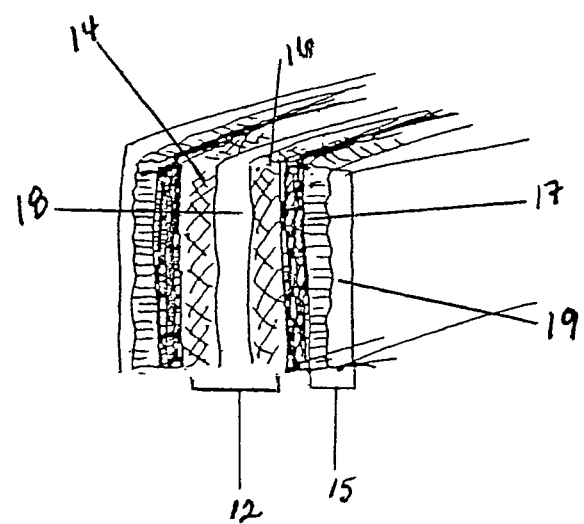
FIG. 1 illustrates an integrated reactor.

An illustration of a portion of a preferred type of reactor apparatus is shown in FIG. 1. Exothermic reaction chamber 12 contains exothermic reaction catalysts 14, 16 and open channel 18. Endothermic reaction chamber 15 includes endothermic reaction catalyst 17 and open channel 19.

In the present invention, the exothermic (and/or endothermic) reaction chamber(s) preferably has a width (the smallest dimension that is perpendicular to flow) of 2 mm or less, more preferably 1 mm or less and in some embodiments 0.5 mm or less. The dimensions of a reaction chamber are the internal dimensions and include catalyst but do not include chamber walls. A reaction chamber wall (separating the exothermic and endothermic reaction chambers) should be thermally conductive and preferably has a thickness (the distance between reaction chambers) of 5 mm or less, more preferably 2 mm or less, and in some embodiments a width of 1 to 2 mm. A short heat transport distance desired for good performance. It has been discovered that these short heat transport distances, combined with preferred reactor configurations, can provide surprisingly high volumetric productivity and low pressure drop.

As described in greater detail below, preferred processes of the invention can be described by the configuration of the apparatus and/or by measurable characteristics such as heat flux, volumetric productivity, and/or pressure drop (which could also be described in conjunction with process conditions such as flow rate, temperature, etc.).

Figure 2A:
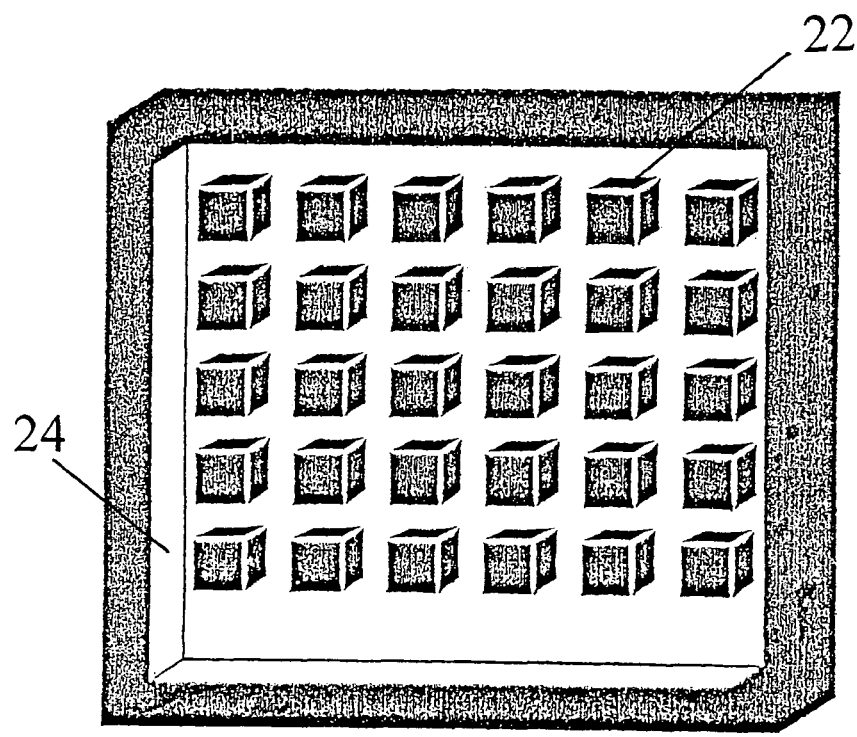
FIGS. 2a and 2b illustrate reaction chamber designs.
Figure 2B:
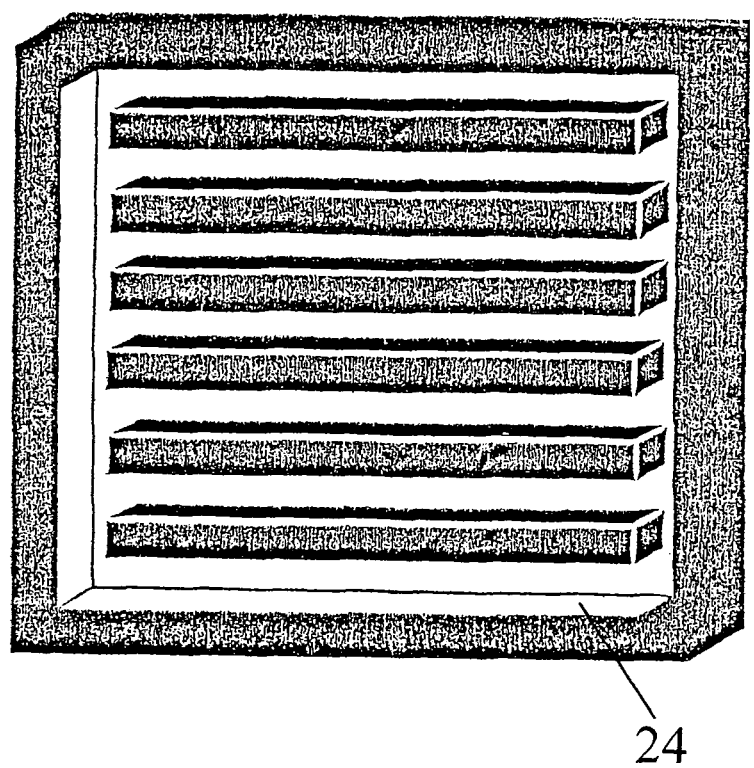

FIG. 1 illustrates reaction chambers having the shape of parallelopipeds; however, it should be appreciated that other shapes such as cylinders (for example, adjacent cylinders or cylinders with an exothermic catalyst partly surrounded by an arc containing an endothermic reaction catalyst, or vice versa), or prisms (preferably close packed prisms to reduce heat transport distance and maximize surface area for thermal transport). Such shapes could be made, for example, by drilling through a block or laminating a stack of shims with shapes, aligned apertures such that the stacked and bonded shims form a passage having borders defined by the edges of the apertures. To increase surface area, in some embodiments, the reaction chamber (either exothermic, endothermic, or both) can have a projections or a set of microchannels such as shown in FIGS. 2a and 2b. The projections 22 or microchannel walls 24 can be coated with a catalyst to form a catalyst coating (not shown) such as by wash coating, chemical vapor coating, etc.

Figure 3:
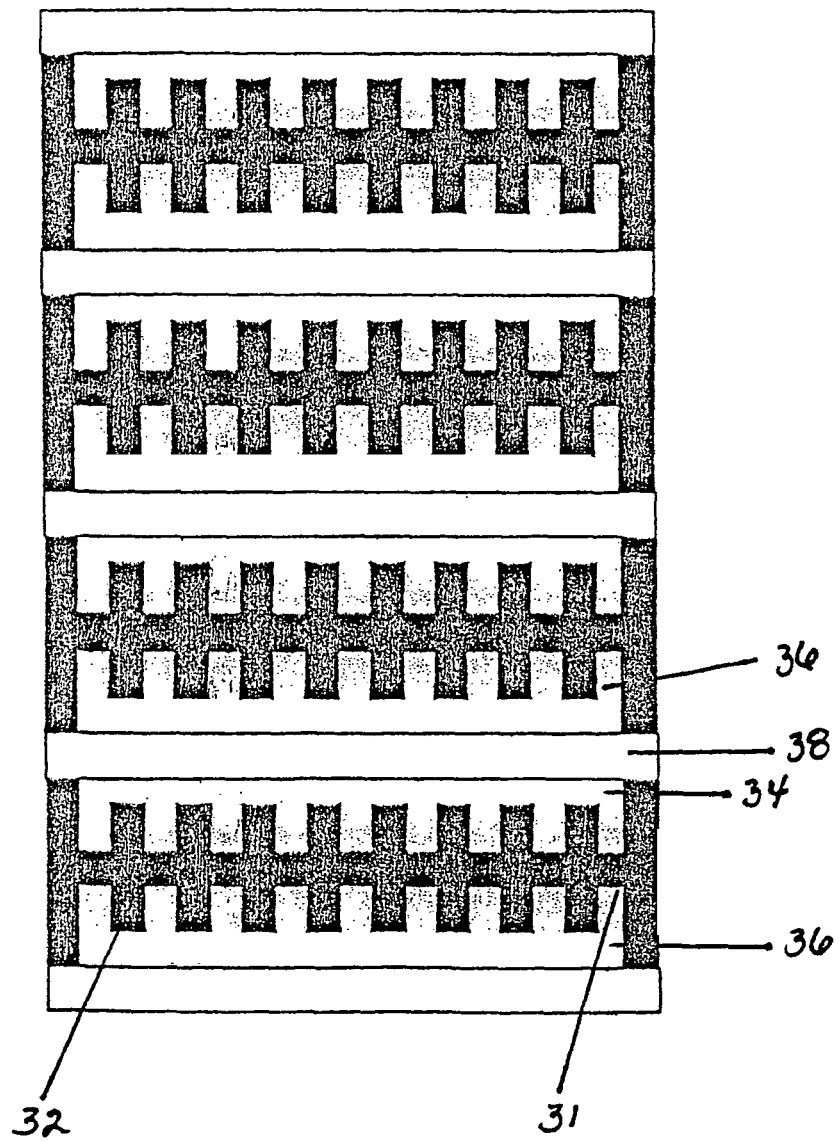
FIGS. 3 and 4a illustrate cross-sections of integrated reactors.

In another preferred embodiment (see FIG. 3), a reaction chamber wall 31 has fins 32. The fins can have any shape and can extend partly or completely over the width of a reaction chamber. Preferably, a catalyst or catalysts (not shown) are deposited over the reaction chamber walls to form exothermic or endothermic reaction chambers. In the illustrated device, flow during operation is into or out of the page. Preferably the reaction chambers are stacked in alternating layers or exothermic 34 and endothermic 36 reaction chambers separated by a thermally conductive chamber wall 38.

Alternating layers of exothermic and endothermic reaction chambers is a general feature of the invention, and preferably there are at least 2, more preferably at least 5 layers of endothermic reaction chambers alternating with at least 1, more preferably at least 4 layers of exothermic reaction chambers. Preferably, the apparatus is designed, and the methods performed such that outer layers have one half the flow of reactants as compared with inner layers of the same type; for example, in a device having 2 exothermic reaction chambers interleaved between 3 endothermic reaction chambers, the outer 2 endothermic reaction chambers have one half the flow of the inner endothermic reaction chamber.

Figure 4A:
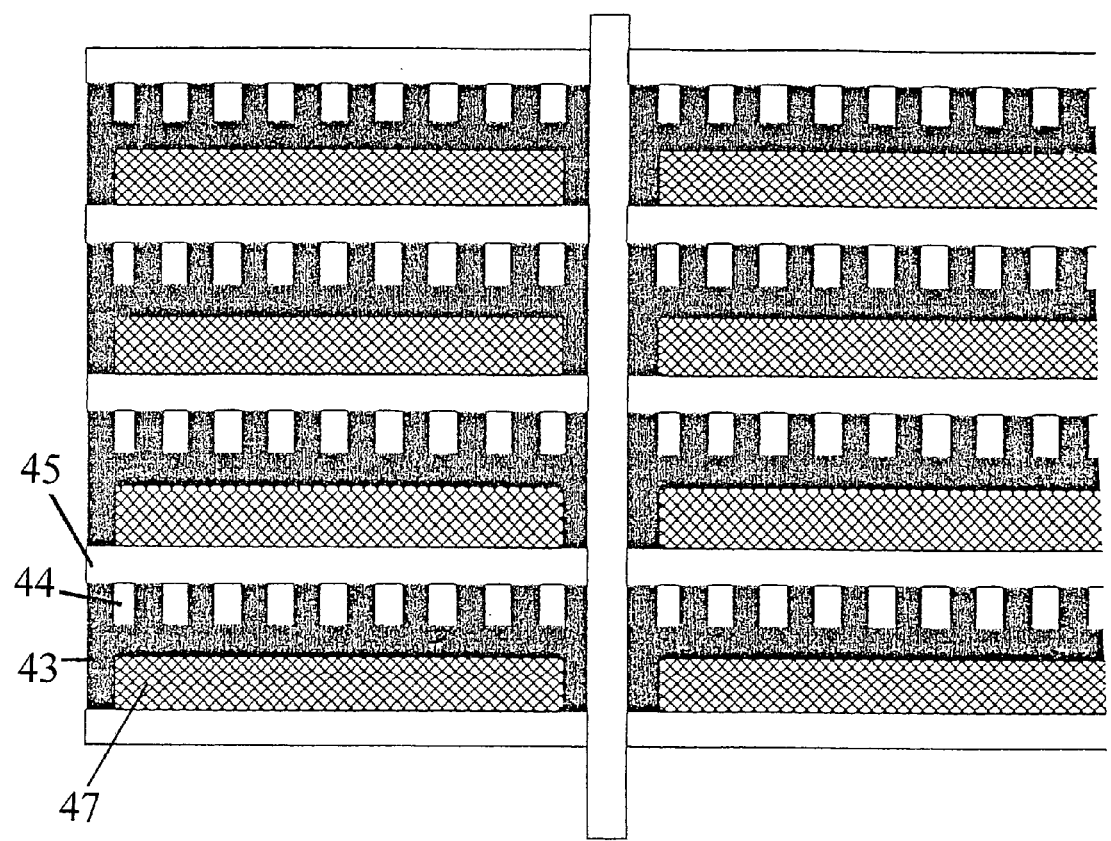
Figure 46:
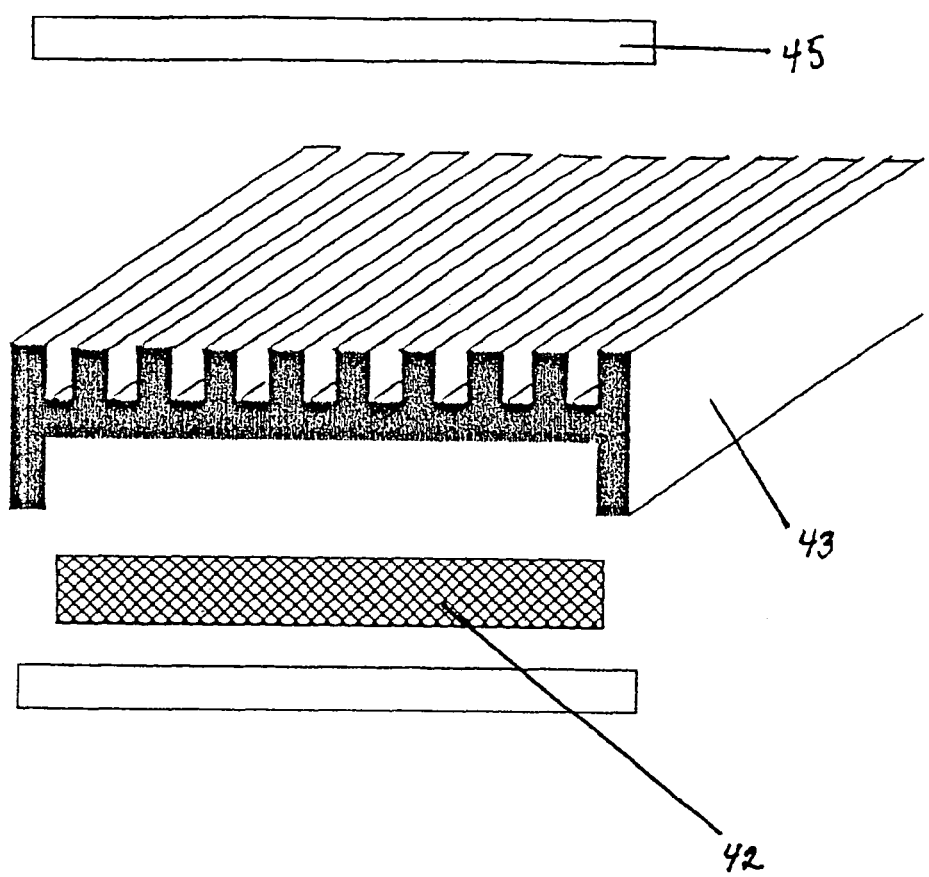

In another embodiment, see FIG. 4a, and integrated reaction chamber is formed by adjacent reaction chambers in which one reaction chamber contains a porous catalyst insert 42 (in FIG. 4a, the insert fills the reaction chamber such that reactants would flow through the catalyst—a less preferred embodiment that can be utilized where relatively large pressure drops are acceptable or the catalyst reaction kinetics do not support very fast reactions of tens of milliseconds). Reactor walls 43, 45 separate chamber 42 from the adjacent reaction chamber 44 that has open channels that may have a catalyst (not shown) disposed in each channel. FIG. 4b shows an exploded view with the pieces that can be assembled into the bonded device.

Figure 5:
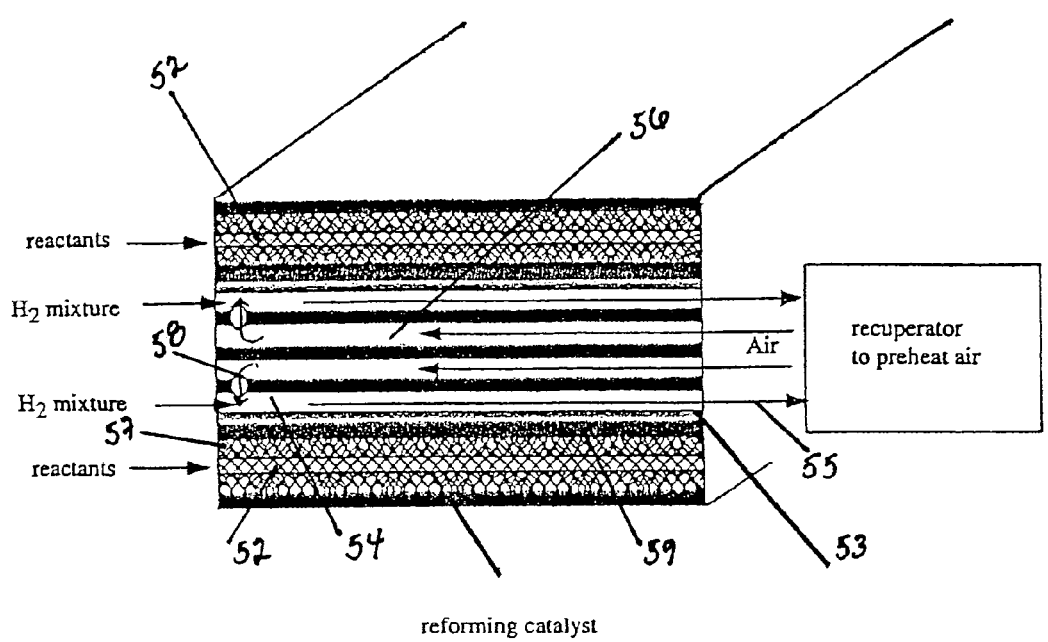
FIGS. 5 and 6 illustrate integrated steam reforming reactors.

FIG. 5 shows an embodiment which could, for example, be for a steam reformer in which hydrogen (or alternate fuel) is combusted to supply heat. A reformate composition flows through open channel 52. Hydrogen (or alternate combustion fuel) flows through open channel 54. Air (or other oxygen-containing composition) in channels 56 flows through aperture 58 and into channel 54 where the oxygen reacts with hydrogen, chiefly on combustion catalyst 53. Preferably, all dimensions in the hydrogen channel are less than or near the quench distance for hydrogen (or alternate fuel, which could comprise hydrogen and other hydrocarbons) and the selected oxidant at the required temperature, although this may not be possible especially in the case of a hydrogen fuel. Combustion exhaust 55 preheats the oxygen-containing composition. Heat of combustion is supplied to the reforming catalyst 57 through reaction chamber wall 59. Desirably, the dimensions of open channel 54 are controlled to suppress flame formation. In this embodiment, the oxygen-containing composition is introduced in the front (i.e., near the hydrogen inlet) of the reactor and the combustion gas and reformate flow in a coflow arrangement. This configuration has two significant advantages: (1) both the exothermic and endothermic reactors have the highest concentration of reactants and therefore fastest reaction in the same area, and (2) the hydrogen is mixed with oxygen within the reaction chamber, thus avoiding premixing and reaction outside the reaction chamber.

Figure 6:
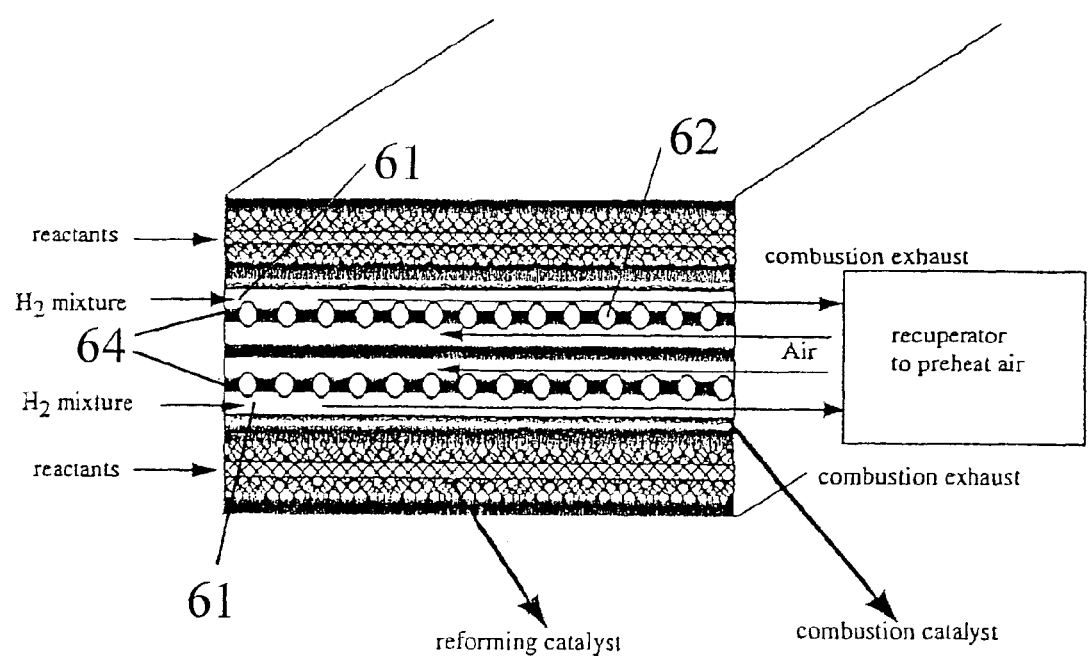
Figure 7:
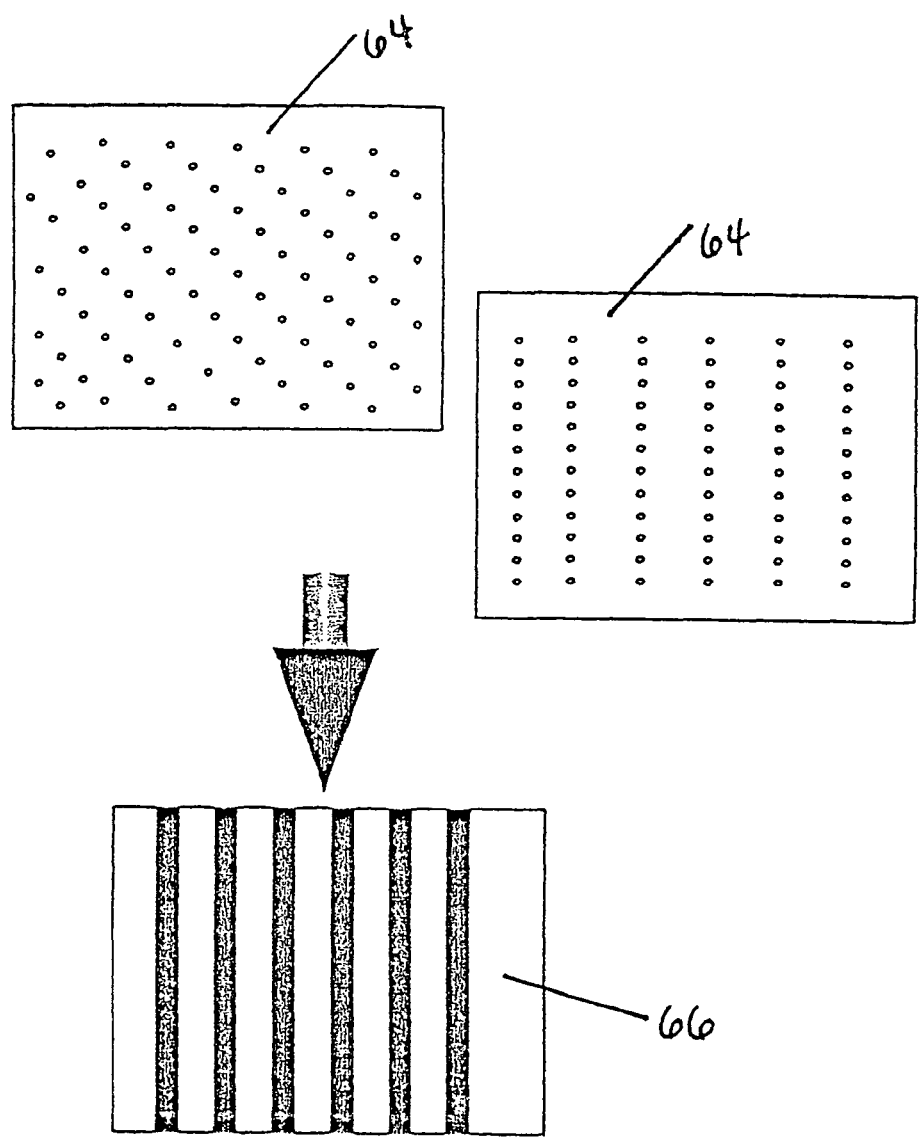
FIG. 7 illustrates shim designs for making a reactor.

FIG. 6a shows a similar arrangement except that the wall separating the hydrogen channel and the air or oxygen channel has multiple apertures 62 that distribute oxygen throughout the hydrogen channel. FIG. 6b is an overhead view of plates that could be used to construct the hydrogen channel(s) 61 and separator plate 64 (either plate could be used). In a variation of the illustrated process in FIG. 6, hydrogen could be distributed into an air (or oxygen) chamber that is adjacent the endothermic reaction chamber.

Of course, it should be appreciated that in any of the devices described herein, alternative reactants could be used in place of any of the reactants mentioned. For example, methane or other fuel could be used in place of hydrogen. Similarly, conditions can be varied, for example, flow could be cross or counter-flow. Although, in some figures, apparatus is shown with only one exothermic reaction chamber, it should be appreciated that multiple alternating layers could be used, or two exothermic reaction chambers could sandwich an endothermic reaction chamber.

A reaction chamber has dimensions of height, width and length. The height and/or width is preferably about 2 mm or less, and more preferably 1 mm or less (in which case the reaction chamber falls within the classical definition of a microchannel). The length of the reaction chamber is typically longer. Preferably, the length of the reaction chamber is greater than 1 cm, more preferably in the range of 1 to 50 cm. Typically, the sides of the reaction chamber are defined by reaction chamber walls. These walls are preferably made of a hard material such as a ceramic, an iron based alloy such as steel, or monel, or high temperature nickel based superalloys such as inconel 625, inconel 617 or Haynes 230. More preferably, the reaction chamber walls are comprised of stainless steel or inconel which is durable and has good thermal conductivity.

In addition to thermal transfer between adjacent reaction chambers, in some embodiments, a reaction chamber can be in thermal contact with a microchannel heat exchanger. This combination of reaction chamber(s) and heat exchanger(s) can result in high rates of thermal transfer. Examples and more detailed description including the use of microchannel heat exchangers are provided in U.S. patent application Ser. No. 09/492,246, filed Jan. 27, 2000, now U.S. Pat. No. 6,616,909 incorporated herein by reference. In some embodiments, the reaction chamber(s) and heat exchangers have a heat flux of at least 0.6 W per cubic centimeter of reactor volume.

In some preferred embodiments, the reaction chamber has an inlet and an outlet with a contiguous bulk flow path from the inlet to the outlet. In these preferred embodiments, the pressure drop from inlet to outlet is preferably less than 20%, more preferably less than 10% of system inlet pressure. The pressure drop is preferably less than 350 kPa, and more preferably the pressure drop is less than 70 kPa. A low pressure drop is desired to reduce the size and cost of other system equipment such as pumps and compressors. In other less preferred embodiments, the reaction chamber may include a section, such as a porous plug, that interferes with bulk flow.

The integrated reactor works best with specific header designs that 1) prevent combustion reaction upstream of the microchannel catalyst, and 2) uniformly distribute one of the combustion reactants across the microchannel cross-section.

Preferably, the width of the bulk flow path (open channel gap) within a reaction chamber is less than or equal to 1 mm and the length (direction of net flow) is preferably less than or equal to 20 inches (50 cm). The width of the porous catalyst may vary but is preferably at least 20% and more preferably 50% of the circumference of the bulk flow path.

The present invention could also be used for liquid phase reactions. In the case of liquid phase reactions, the critical channel dimension will likely be smaller than that for gas phase reactions to accommodate the reduced mass diffusion rate that brings reactants to the catalytic surface.

The "porous catalyst material" described herein refers to a porous material having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. The porous material can itself be a catalyst, but more preferably the porous material comprises a metal, ceramic or composite support having a layer or layers of a catalyst material or materials deposited thereon. The porosity can be geometrically regular as in a honeycomb or parallel pore structure, or porosity may be geometrically tortuous or random. Preferably the support is a foam metal, foam ceramic, metal felt (i.e., matted, non-woven fibers), or metal screen.

Preferred major active constituents of the catalysts include: elements in the IUPAC Group IIA, IVA, VA, VIA, VIIA, VIIIA, IB, IIB, IVB, Lanthanide series and Actinide series. The catalyst layers, if present, are preferably also porous. The average pore size (volume average) of the catalyst layer(s) is preferably smaller than the average pore size of the support. The average pore sizes in the catalyst layer(s) disposed upon the support preferably ranges from $10^{-9}$ m to $10^{-7}$ m as measured by $N_2$ adsorption with BET method. More preferably, at least 50 volume % of the total pore volume is composed of pores in the size range of $10^{-9}$ m to $10^{-7}$ m in diameter. Diffusion within these small pores in the catalyst layer(s) is typically Knudsen in nature for gas phase systems, whereby the molecules collide with the walls of the pores more frequently than with other gas phase molecules.

In preferred embodiments, catalysts are in the form of inserts that can be conveniently inserted and removed from a reaction chamber. Reaction chambers (either of the same type or of different types) can be combined in series with multiple types of catalysts. For example, reactants can be passed through a first reaction chamber containing a first type of catalyst, and the products from this chamber passed into a subsequent reaction chamber (or a subsequent stage of the same reaction chamber) containing a second type of catalyst in which the product (or more correctly termed, the intermediate) is converted to a more desired product. If desired, additional reactant(s) can be added to the subsequent reaction chamber.

The catalyst could also be applied by other methods such as wash coating. On metal surfaces, it is preferred to first apply a buffer layer by chemical vapor deposition, thermal oxidation, etc. which improves adhesion of subsequent wash coats.

Preferred reactors and methods of conducting reactions in integrated reactors can be characterized by their properties. Unless specified otherwise, these properties are measured using the testing conditions described in the Examples section. The invention can be characterized by any of the properties individually or in any combination. Average volumetric heat flux is preferably at least 1 W/cc, or, in other preferred embodiments, at least 5, or 10, or 20, or 50, or 100, or about 120 W/cc, and in some embodiments between 10 and about 120 W/cc. The devices can be characterized by the low $NO_x$ output when measured by the standard $NO_x$ test measurement that is described in the Examples section. $NO_x$ output is preferably less than 100 ppm, more preferably less than 50 ppm, still more preferably less than 10 ppm, and still more preferably less than 5 ppm, and in some embodiments, $NO_x$ output is in the range of about 5 to 20 ppm. The inventive processes involving combustion preferably use less than 100% excess air (or, equivalently, excess oxygen), more preferably less than 75%, still more preferably less than 50%, yet still more preferably less than 25%, or 10% or 5% excess air. For characterizing devices, excess oxygen is measured under the conditions set forth in the Heat Flux Measurement Test or (if characterized in conjunction with $NO_x$ output) measured under the conditions set forth in the standard $NO_x$ test measurement. Pressure drop through the exothermic and/or endothermic reaction chambers is preferably less than the following (in order of preference, based on length of reaction chamber) 295,000; 250,000; 125,000; 50,000; 25,000; 12,500; 2500; or 1500 Pa/cm. For devices, the pressure drop is measured under the conditions set forth in the Heat Flux Measurement Test or (if characterized in conjunction with $NO_x$ output) measured under the conditions set forth in the standard $NO_x$ test measurement.

The devices may be made of materials such as plastic, metal, ceramic and composites, depending on the desired characteristics. Walls separating the device from the environment may be thermally insulating; however, the walls separating adjacent exothermic and endothermic reaction chambers should be thermally conductive.

The devices can be made by forming chambers within a single block of material, by joining multiple components, and by stacking and bonding shims.

A preferred integrated reactor body can be made from a single block of metal. Its channels could be created with a wire EDM in the main body, and the headers and footers could be made separately and welded on, adding to the flexibility of the design. Wire EDM is used to create slots or holes in a block of metal that are the microchannels through which flow passes and a unit operation occurs. Sinker EDM, laser machining, and in some larger channels conventional milling can also be used to make channels from a single block of metal.

The aperture-containing shims can be formed by processes including: conventional machining, wire EDM, laser cutting, photochemical machining, electrochemical machining, molding, water jet, stamping, etching (for example, chemical, photochemical and plasma etch) and combinations thereof. For low cost, stamping is especially desirable. The shims may be joined together by diffusion bonding methods such as a ram press or a HIP chamber. They may also be joined together by reactive metal bonding or other methods that create a face seal. Alternately, laser welding shims could join the devices or sheets to form seals between flow paths. Devices could alternatively be joined by the use of adhesives. In preferred embodiments, devices are laminated in a single step, in less preferred embodiments, a first set of shims is bonded together and subsequently bonded to a second (or more) set of shims. In some preferred embodiments, a set of shims is bonded together in a single step and then the resulting bonded article is cut into multiple devices.

Catalytic processes of the present invention include: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, oxidation, partial oxidation, polymerization, reduction, reformation, reverse water gas shift, sulfonation, telomerization, transesterification, trimerization, and water gas shift.

Another advantage of the present invention is that good yields (or other measures of good performance) can be obtained with short contact times. In preferred methods, the contact time is less than 100 milliseconds (ms), more preferably less than 50 ms and still more preferably between 1 and 25 ms for gas phase reactions. Liquid phase reactions would be expected to be at least three orders of magnitude slower. Contact time may be reduced by reducing the diffusion distance between the bulk flow and the porous catalyst while concurrently reducing channel length. At these contact times, in a preferred embodiment of hydrocarbon steam reforming, at least 70%, more preferably at least 90%, of the equilibrium conversion of the hydrocarbon entering the beginning of said at least one reaction chamber is converted to hydrogen, carbon monoxide and/or carbon dioxide. Similar improvements can be obtained in other processes.

Some process characteristics of some preferred inventive processes include the following:

1. Operate safely at a fuel:oxygen ratio near stoichiometric (less than 100% excess air) for the use of combustion as the exothermic reaction. This reduces the required air which improves the overall system thermal efficiency and reduces the required duty for the external air blower or compressor.
2. Operate steam reforming at short contact times or conversely at high gas hourly space velocities. This is required to create a compact device.
3. Operate with a high heat flux. This is required to operate at short contact times.
4. Operate with a low pressure drop per unit length of reactor. This enables a higher productivity per unit volume.
5. Optional: quench/inhibit gas phase reactions. As the channel dimension nears the quench diameter or drops below, then the contribution of the unwanted gas phase homogeneous combustion reaction is reduced.

In its broader aspects, the invention relates to any pair (or more, that is, different compositions can be run through different reaction chambers having different catalysts) of endothermic and exothermic reactions.

In steam reforming, gas hourly space velocity is preferably greater than 10,000, more preferably greater than 50,000, and may range from about 100,000 $hr^{-1}$ to over $10^6$ $hr^{-1}$ corresponding to a contact time on the order of 100 to 1 milliseconds, respectively. Operating pressures for methane steam reforming may range from 1 atm to 50 atm. A range of 1 to 30 atm is preferred. Steam to carbon ratios may range from 1 to 10; a range of 1 to 3 is preferred.

A variety of hydrocarbons can be reformed to produce hydrogen, including methane, ethane, propane, alkanes in general, alkenes, alcohols, ethers, ketones, and the like including blends and mixtures such as gasoline, diesel, kerosene, and others.

In addition, the present invention can be used to intensify other endothermic reactions beyond steam reforming. As an example, the present invention could be used to intensify a dehydrogenation reaction by supplying heat via an integrated combustion reaction.

EXAMPLES

Preferred catalysts for use in the apparatus described in the Examples were prepared according to the following procedures:

The catalyst in the reformer channels contained a catalyst of 13.8%-Rh/6%-MgO/$Al_2O_3$ on a metal felt of FeCrAlY alloy obtained from Technetics, Deland, Fla. The reforming catalysts were prepared using a wash-coating technique based on FeCrAlY felt with 0.01" thickness and 90% porosity. Before wash coating, metal felt was pretreated by a rapid heating to 900° C. in air for 2 hours. To enhance the adhesion between the metal surface and the catalyst, a dense and pinhole-free interfacial layer was first coated onto the oxidized FeCrAlY felt by metal organic chemical vapor deposition (MOCVD). This interfacial layer can be $Al_2O_3$, $Al_2O_3+SiO_2$, or $TiO_2$, etc. For example, when $TiO_2$ was coated, titanium isopropoxide (Strem Chemical, Newburyport, Mass.) was vapor deposited at a temperature ranging from 250 to 900° C. at a pressure of 0.1 to 100 torr. Titania coatings with excellent adhesion to the foam were obtained at a deposition temperature of 600° C. and a reactor pressure of 3 torr. This layer not only increases the adhesion between metal felt and the catalyst, it also protects the FeCrAlY from corrosion during the steam reforming reaction. 13.8 wt % Rh6 wt % MgO/$Al_2O_3$ powdered catalyst was prepared by 1) calcining a high surface area gamma-alumina at 500° C. for 5 hours; 2) impregnating the gamma alumina with MgO using the incipient wetness method with an aqueous solution of magnesium nitrate; and obtaining an MgO modified gamma alumina support; 3) drying the modified support at 110° C. for 4 hours followed by 4) a second calcination at 900° C. for 2 hours; 5) impregnating the modified support with $Rh_2O_3$ with the incipient wetness method from a rhodium nitrate solution; 6) followed by a final drying at 110° C. for 4 hours and a 7) final calcinations at 500° C. for 3 hours to obtain a powder of the supported catalyst. Catalyst coating slurry was prepared by mixing powder catalyst aforementioned with de-ionized water in the ratio of 1:6. The mixture was ball-milled for 24 hours to obtain coating slurry containing catalyst particles less than 1 micron. The heat-treated and CVD coated felt was wash-coated by dipping the felt into catalyst slurry. The wash coating process may be repeated to obtain desired weight gain. Between each coating, the felt coated with catalyst was dried in an oven at 100° C. for 1 hour. The coating procedure is repeated to achieve desired coating thickness or catalyst loading. After the final coating step, the catalyst was dried overnight in an oven at 100° C. and calcined by heating slowly in air at rate of 2° C./min to a temperature in the range of 300 to 500° C. The amount of catalyst coated was measured to be 0.1 gram catalyst per square inch (6.5 cm$^2$) of felt. Prior to steam reforming testing, the engineered catalyst felt was subjected to an activation treatment, preferably reduction at 300-400° C.

The integrated combustion catalyst can be a wash-coated catalyst that is applied directly to the interior Inconel walls of the ICR device. The Inconel surface is first cleaned, ultrasonically if possible, in hexane, nitric acid (20%) and acetone (or propanol). Preferably, the cleaning solutions are flowed over the Inconel surfaces. A native chromium oxide layer is then formed on the Inconel surface by heating in air (flowing, if possible) at 3.5° C./min to 500° C., and held at 500° C. for 2 hours. The temperature is then increased at 3.5° C./min to 950° C., and held at 950° C. for 2 hours. The Inconel is then allowed to cool to room temperature at a rate no faster than 5° C./min. The active palladium component is then applied to the chromia layer by submersing the required deposition area in a 10-wt % solution of palladium nitrate. This is accomplished either by static submersion, or by pumping the fluid into a device to a required liquid level. The solution is then allowed to remain in contact with the deposition surface for 2 minutes. The solution is then removed from contact with the Inconel surface, and the amount of palladium remaining is calculated through a difference measurement. In the case of channel coating, nitrogen is flowed through the channel do ensure no plugging occurs. The catalyst is then dried at 100° C. for one hour, under vacuum if possible. The catalyst is then calcined by heating at 3.5° C./min to 850° C., held at 850° C. for 1 hour. The catalyst is then allowed to cool to room temperature at a rate no greater than 5° C./min.

For some examples, a felt form of the combustion catalyst was prepared and then inserted into the combustion microchannel(s).

Engineered combustion catalyst was also prepared based on the FeCrAlY felt from Technetics. Similar to the preparation of engineered steam reforming catalysts, the FeCrAlY felt substrate was first fired at 900 C in air for 2 h in a muffle furnace (ramping rate=20 C/min). After the firing process, the felt was cooled to room temperature. It was then dip-coated in a colloid Al$_2$O$_3$ solution (PQ corporation) containing micron sized gamma Al$_2$O$_3$ particles. This step was conducted by immersing the felt into the solution, then removing excess solution on the felt on an absorbent sheet, followed by drying under vacuum at 110 C for overnight. The sample was heated to 500 C for 3 h prior to the addition of Pd. The Pd was added by soaking the engineered substrate, now containing an Al$_2$O$_3$ layer into a 20 wt % Pd(NO$_3$)$_2$ solution (Engelhard). Upon removing excess Pd(NO$_3$)$_2$ solution, the sample was dried in vacuum at 110 C for at least 4 h. Final calcination was conducted by heating at 2 C/min to 350 C, and holding isothermally at that temperature for 3 hrs. The prepared Pd/Al$_2$O$_3$ engineered catalyst has a nominal loading of 47 wt % Pd over Al$_2$O$_3$ and 0.126 g-cat/g of FeCrAlY.

Example 1

Integrated Combustor Reactor (ICR)

Figure 8:
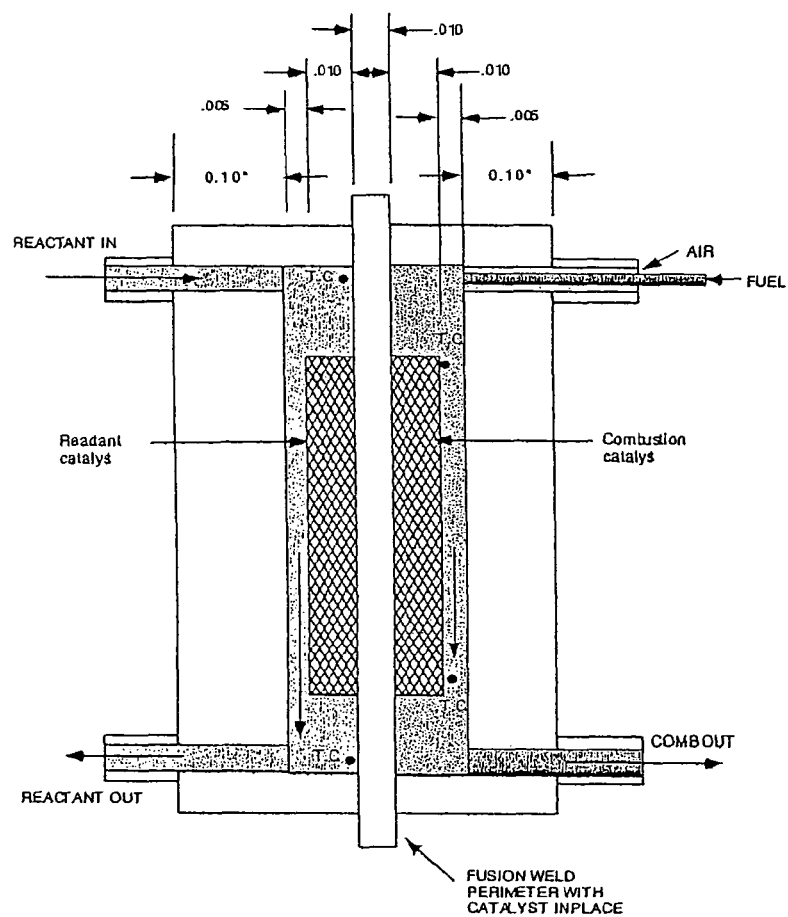
FIG. 8 is a schematic illustration of a reactor used in the Examples.

This integrated catalytic combustor reactor was composed of a single methane steam reformer channel that shares a wall with a single catalytic combustion channel. Heat was transferred through this common wall from the hot (combustion) side to the cold (reforming reaction) side to drive the endothermic reaction. One design (version 1) of the ICR had no header or footer space for the combustion stream, instead introducing the unmixed combustion gases directly onto the catalyst. This was done to insure that homogeneous combustion did not occur upstream of the catalyst (i.e. in the header). A second design of the ICR (version 2) was fabricated which included a 0.25" (6.4 mm) by 0.4" (10.2 mm) header and footer space on the combustion side, identical to those on the reformer side (see FIG. 8). This was done to reduce the likelihood of channeling on the combustor side and to more evenly distribute the flow (and thus the heat of reaction) over the entire width of the reactor, thus prolonging catalyst life and increasing reformer conversion. The overall dimensions of each ICR unit were 0.23"×0.5"× 1.7" and the dimensions of each catalyst were 0.01"×0.5"× 1.0". For the purposes of heat flux calculations for this example only, 0.4" catalyst width was included as the remaining catalyst volume was occluded from reactant flow. Both the reformer and combustor channel catalysts operated with flow of the reactants through the catalyst (and therefore excessively high pressure drop), having no flow-by gap once assembled. The experimental test conditions used are shown in Table 1. Combustion fuel and air were not preheated and SMR reactants were preheated to ~600-650° C. Although outlet pressures are not reported, they are close to ambient (~1 bar absolute).

The integrated combustor reactor devices (version 1 and version 2) were fabricated from a 0.010 inch (0.25 mm) Inconel 625 heat transfer shim that was perimeter welded between two 0.115 inch (2.9 mm) by 0.7 inch (17.8 mm) by 1.7 inch (43.2 mm) plates. One plate held the engineered combustion catalyst against the heat transfer shim, while the other plate held the engineered SMR catalyst against the opposite side of the shim. Each plate admitted reactants (combustion or SMR) into a cavity (machined into the inside face) through a 0.125 inch (3.2 mm) O.D. (1.8 mm I.D.) inconel tube at one end and discharged products through a similar tube at the other. Except in the case of the version 1 combustion plate, a 0.25 inch (6.4 mm) length of flow-path between the catalyst and the inlet or outlet tube was included to provide for header and footer regions to help distribute the flow throughout the cross-section. Each catalyst was held in intimate thermal contact with the heat transfer shim by 0.050 inch (1.3 mm) by 1.0 inch (25.4 mm) rails machined on either side of the flow path. Fuel was introduced into the device through a 0.063 inch (1.6 mm) tube (1.1 mm I.D.) nested in a concentric fashion inside the air inlet tube, so that the air and fuel were not allowed to mix until the end of the 1.6 mm tube (about 1-2 mm from the heat transfer shim).

The heat transfer area between the two catalysts was 0.4 inches (10.2 mm) by 1.0 inches (25.4 mm). The reactor core volume (used to calculate average volumetric heat flux) was assumed to be the heat transfer area times the sum of the heat transfer web thickness (0.25 mm), SMR channel thickness (0.25 mm), and combustion channel thickness (0.25 mm).

After two thermal cycles and six hours of operation using the first configuration, the flow configuration was changed from co-flow to counter-flow in an attempt to further improve the heat transfer to the steam reformer. Only hydrogen/air mixtures were used in the operation of the first design in order to eliminate the possibility of coke formation in the combustor.

Version 2 was tested continuously (in a co-flow configuration) for three hours combusting a hydrogen/air mixture and for four hours combusting a methane/air mixture. During operation of ICR version 2 the fuel equivalence ratio was not allowed to exceed 0.7, thus maintaining maximum equivalence ratio of 0.95), giving a maximum combustor exit temperature of 1050° C. or less. In contrast, an external hydrogen combustor would require 186% excess air (fuel equivalence ratio of 0.35) to keep the adiabatic combustion product temperature to 1050° C. or below. A typical pressure drop through the combustion channel was ~40 psig for the 1.75 ms contact time. Pressure drop in the microreactor with integrated combustor was much higher on the combustion side due primarily to the much higher flow rates (much shorter contact times) and secondarily to the manner in which the air was fed (through a very narrow annulus).

TABLE 1

Summary of best results from devices of example 1.

|  | Version 1 | Version 1 | Version 2 | Version 2 | Version 2 | Version 2 |
|---|---|---|---|---|---|---|
| air inlet T (° C.) | 25 | 25 | 25 | 25 | 25 | 25 |
| air inlet pressure (psig) | 41 | 41 | 59 | 59 | 78 | 78 |
| air inlet pressure ($Pa/10^5$) | 3.8 | 3.8 | 5.1 | 5.1 | 6.4 | 6.4 |
| fuel inlet T (° C.) | 25 | 25 | 25 | 25 | 25 | 25 |
| $CR^a$ $H_2$ flow (SLPM) | 0.326 | 0.326 | 0.304 | 0.304 | 0 | 0 |
| $CR^a$ $CH_4$ flow (SLPM) | 0 | 0 | 0 | 0 | 0.099 | 0.099 |
| CR air flow (SLPM) | 0.78 | 0.78 | 0.975 | 0.975 | 1.385 | 1.385 |
| excess air | 0% | 0% | 35% | 35% | 47% | 47% |
| CR max. meas. temperature (° C.) | 1055 | 1046 | 936 | 902 | 864 | 839 |
| CR contact time (ms) | 3.6 | 3.6 | 3.1 | 3.1 | 2.7 | 2.7 |
| CR GHSV (per hour) | 1000000 | 1000000 | 1161290 | 1161290 | 1333333 | 1333333 |
| CR $H_2$ conversion | NM | 99.9% | 99.9% | 100.0% | 99.6% | NM |
| CR pressure drop (psi) | <41 | <41 | <59 | <59 | <78 | <78 |
| CR pressure drop ($Pa/10^5$) | <3.8 | <3.8 | <5.1 | <5.1 | <6.4 | <6.4 |
| SR preheat T (° C.) | 645 | 645 | ~580 | ~580 | ~580 | ~580 |
| SR inlet pressure (psig) | 10.5 | 24.5 | 44.5 | 64 | 48 | 72 |
| SR inlet pressure ($Pa/10^5$) | 1.7 | 2.7 | 4.1 | 5.4 | 4.3 | 6.0 |
| $SR^a$ $CH_4$ flow (SLPM) | 0.0167 | 0.0485 | 0.0253 | 0.0498 | 0.0253 | 0.0498 |
| SR $H_2O$ flow (SLPM) | 0.05 | 0.152 | 0.0785 | 0.158 | 0.0748 | 0.148 |
| steam:C (mol:mol) | 3 | 3.1 | 3.1 | 3.2 | 3 | 3 |
| SR contact time (ms) | 60 | 20 | 38 | 19 | 39 | 20 |
| SR GHSV (per hour) | 60000 | 180000 | 94737 | 189474 | 92308 | 180000 |
| SR body temperature (° C.) | 790 | 773 | 812 | 785 | 840 | 813 |
| SR $CH_4$ conversion | 79.7% | 54.5% | 97.7% | 93.6% | 98.0% | 94.0% |
| SR selectivity to CO | 79.5% | 66.6% | 61.0% | 60.2% | 66.3% | 65.4% |
| SR pressure drop (psi) | <10.5 | <24.5 | <44.5 | <64 | <48 | <72 |
| SR pressure drop ($Pa/10^5$) | <1.7 | <2.7 | <4.1 | <5.4 | <4.3 | <6.0 |
| avg. heat flux ($W/cm^2$) | 0.8 | 1.6 | 1.5 | 2.7 | 1.5 | 2.8 |
| avg. volumetric heat flux ($W/cm^3$) | 10.8 | 20.7 | 19.1 | 35.7 | 19.5 | 36.6 |

$^a$CR refers to combustion process side; SR refers to reforming process side.

adiabatic flame temperatures for $H_2$/air mixtures of 1740° C. (as opposed to ~2110° C. at stoichiometric) and 1565° C. for $CH_4$/air mixtures.

TABLE 1

Conditions used in reduction to practice of ICR.

|  | Version 1 | Version 2 | Version 2 |
|---|---|---|---|
|  | CR fuel/oxidant | | |
|  | $H_2$/air | $H_2$/air | $CH_4$/air |
| CR contact time | 1.75 ms | 1.60-1.92 | 1.35-1.92 |
| CR excess air | 5% | 43% | 43% |
| SR contact time | 14-30 ms | 9.5-19.0 | 10.0-19.7 |
| SR steam to carbon ratio | 2.8-3.4 | 3.1-3.2 | 3.0-3.1 |
| flow configuration | co/counter-flow | co-flow | co-flow |

CR refers to the combustion reaction, while SR refers to the steam reforming of methane reaction.

Results

Version 1

A hydrogen conversion of 99.9% was achieved in the integrated combustor reactor with 5% excess air (fuel equivalence ratio of 0.95), giving a maximum combustor exit temperature of 1050° C. or less. In contrast, an external hydrogen combustor would require 186% excess air (fuel equivalence ratio of 0.35) to keep the adiabatic combustion product temperature to 1050° C. or below.

Figure 9:
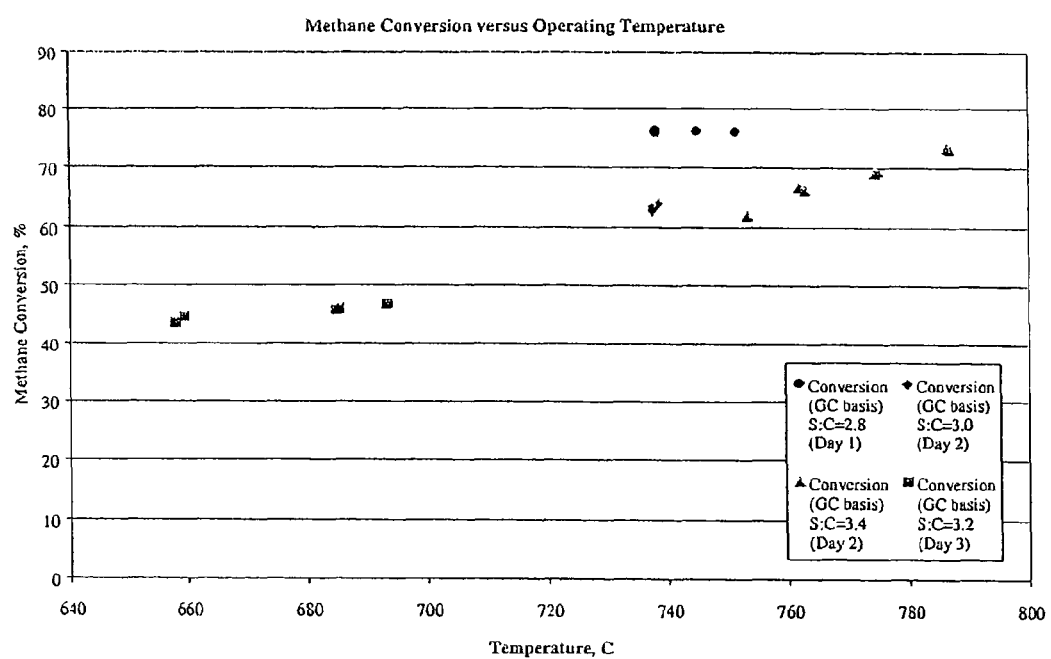
FIGS. 9-12 are data from the Examples.
Figure 10:
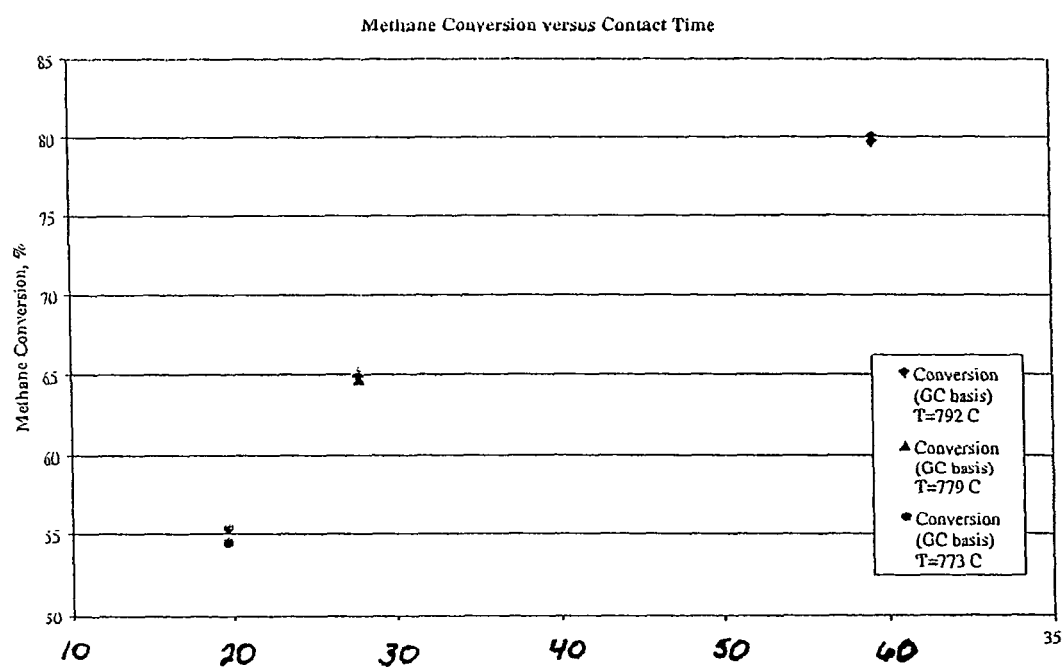

The ICR steam reformer (for a steam to carbon ratio of ~3) was able to extract heat from the integrated combustor in the co-flow configuration, maintain steam reforming temperatures of 780-800° C. and methane conversions as high as 75%, with reformer contact times of 20-60 ms (see FIGS. 9-10, contact time calculated based on entire channel volume, including catalyst and the total gas flowrate at standard temperature and pressure).

It was found that, in this device, for combustor whole channel contact times of less than 3.5 ms (5% excess air), the hydrogen combustion zone appeared to extend past the exit of the catalytic combustion area. A decreasing combustor exit gas temperature and an increasing gas temperature immediately downstream of the exit with increasing combustor flow rate evidenced this. High combustor fuel flow rates (i.e. <4 ms contact times) were required to achieve reformer temperatures of 750° C. and higher. This is likely due to channeling of the combustion stream down the central 30% of the combustion catalyst. If channeling and catalyst deactivation could be eliminated, it is thought that hydrogen/air contact times of <1.2 ms might be achieved. Although combustor exit temperatures were far below adiabatic flame temperatures, examination of the combustion catalyst revealed evidence of noble metal sintering or vaporization and re-deposition. This suggests that an unacceptably high-temperature region existed in the combustor (>1200° C.).

Version 2 Combustor (CR)

The inclusion of a header in the combustor of ICR version 2 greatly improved the efficiency of operation of both the combustor and the reformer. Results of combustor tests for ICR version 2 are shown in Table 2. The highest pressure drop across the combustor side of the ICR version 2 was 5.4 bar (78 psid), for $CH_4$/air at 2.8 ms whole channel contact time.

During operation of the version 2 device, two combustor operation regimes were observed. In the first regime, the maximum temperature seen on the steam reforming side was in the header, directly opposite the combustor inlet (typically >100° C. above the maximum body temperature). This is strong evidence that, in this regime, a homogeneous combustion zone exists in the header of the combustor. In the second combustion regime, the maximum temperature in the reformer is the body temperature (at the thermocouple well in the center of the side plate, sunk 1.78 mm deep into the plate wall), rather than in the header. In addition, in the second regime the temperature at the combustor inlet drops below the auto-ignition temperature for the fuel/air mixture. This is evidence that regime 2 does not involve combustion in the header. In other words, in regime 2 a flame will not attach in a stable fashion to the fuel inlet tube in the header. Table 2 describes the conditions for which each regime was observed during operation of version 2. The transition between regime 1/regime 2 (as identified by a sudden discontinuous change in the reformer header temperature) was observed twice during testing, each time ~3-4 minutes after a change was made in the process conditions.

In this device at the conditions shown in Table 2, hydrogen combustion operates only in regime 1, probably due to the unusually high flame speed of hydrogen/air mixtures (an order of magnitude higher than methane/air mixtures). On the other hand, methane combustion was observed in both regimes, with the transition occurring somewhere between ~600-1000 sccm total reactant flow. Both combustion fuels/regimes gave similar results (in terms of steam reformer performance) at identical total flows and fuel equivalence ratios, although reformer temperatures were much more uniform (along the flow path) for regime 2. No decrease in combustor fuel conversion was observed over the course of seven hours of operation.

TABLE 2

Results of combustor analysis during operation of ICR unit at a fuel equivalence ratio of 0.7 (43% excess air).

| fuel | fuel flow (sccm) | air flow (sccm) | contact time (ms) | regime | body $T^a$ (° C.) | conversion (%) | $CO_2$ select. (%) |
|---|---|---|---|---|---|---|---|
| $H_2$ | 228 | 792 | 1.9 | 1 | 785 | 100.0 | — |
| $H_2$ | 280 | 951 | 1.6 | 1 | 810 | 97.9-100.0 | — |
| $CH_4$ | 70 | 956 | 1.9 | 2 | 775 | 99.1 | 100.0 |
| $CH_4$ | 84 | 1148 | 1.6 | 2 | 810 | 99.4 | 100.0 |
| $CH_4$ | 99 | 1356 | 1.4 | 2 | 860 | 99.6 | 100.0 |
| $CH_4$ | 43 | 570 | 3.2 | 1 | regime transition during shut down | | |

$^a$Combustor body temperatures are for center thermocouple well and correspond to baseline reformer case (100 sccm SR flow). In every case this body temperature was the highest temperature observed on the combustor side (although higher internal temperatures were clearly present) and the footer temperature was the lowest observed.

Version 2 Steam Reformer (SR)

Figure 11:
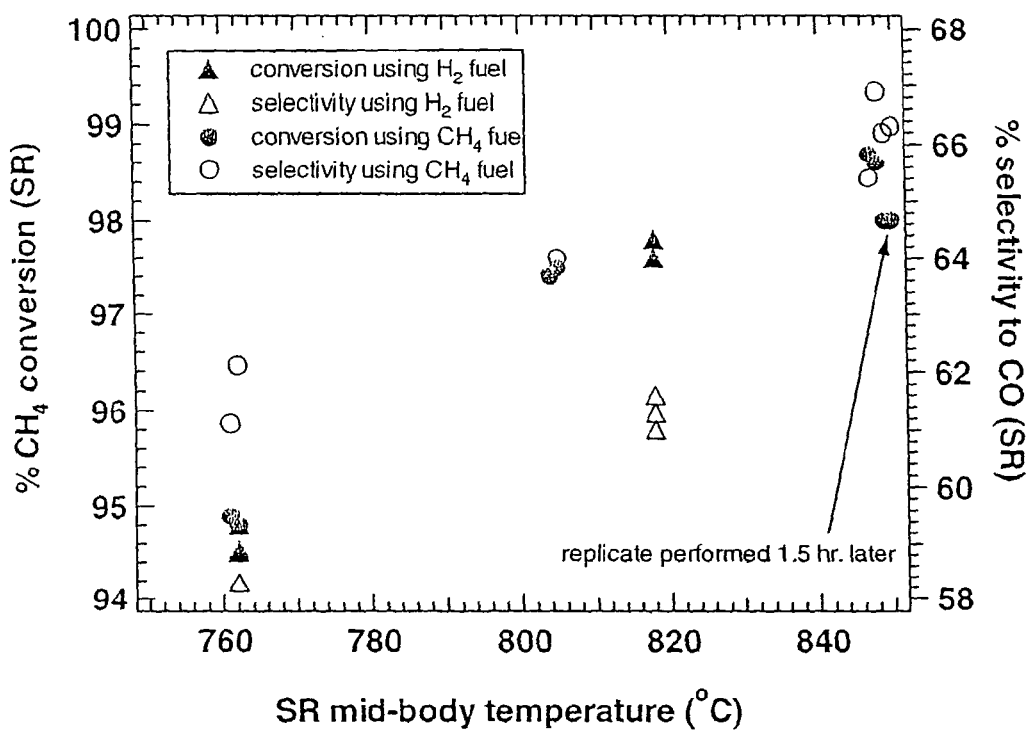
Figure 12:
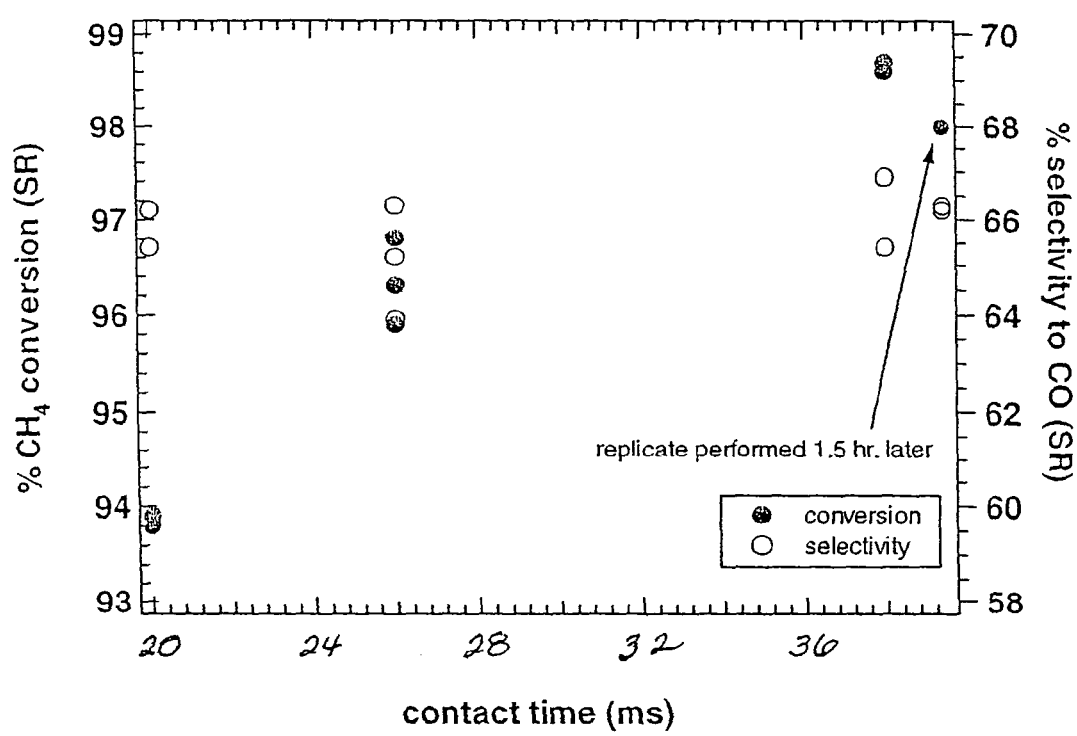

Because of the ability of the version 2 combustor to perform more efficiently and more uniformly, the steam reformer was able to achieve much higher conversions than the version 1 reformer. The results of the version 2 ICR are shown in FIGS. 11-12. As expected, conversion increases with increasing temperature (see FIG. 11), but the temperature inside the reformer is difficult to ascertain in such a small device, as the header, footer, and body temperatures are likely much lower than the inside gas temperature. Conversion of SR methane decreased with decreasing contact time between 40 and 20 ms (see FIG. 12), although the change is exaggerated since the temperature also dropped with increasing throughput (by at least 25° C.). Selectivity to CO increases significantly with increasing temperature (FIG. 11), but not with increasing contact time (FIG. 12). The highest SR conversion was at the hottest condition (65.4 $W_{thermal}$ methane combusted in 43% excess air), where 98.6% methane conversion and 66% selectivity to CO were achieved at 48 psig feed pressure, 3:1 steam:carbon, and 38.0 ins (SR) contact time. After 1.5 hours of operation at the hottest combustor temperature, the conversion dropped to 98.0%, evidence of slight deactivation. The lowest SR methane conversion was 93.6% for a SR contact time of 19.0 ms. The steam reformer was on line for a total of 6.5 hours. The carbon balance closed to within ±4% for all but one condition.

Conclusions

The following are significant findings of Example 1:
1. Integrated hydrogen/air combustion (flow-by configuration) looks very promising for well mixed, uniformly dispersed streams, low excess air, and whole channel contact times as low as 3.2 ms if a header is included in the design. 100% $H_2$ conversion was achieved under these combustor (CR) conditions. Integrated methane/air combustion (flow-by configuration) looks extremely promising for well mixed, uniformly dispersed CR streams with low excess air, and whole channel contact times as low as 2.7 ms if a header is included in the design. An incredible 99.6% $CH_4$ conversion with 100% selectivity to $CO_2$ was achieved under these CR conditions, with no air preheat. Such performance could require at least a contact time five times longer (and about 400° C. of air preheat) for methane combustion in an external catalytic combustor.
2. An integrated catalytic combustion channel can provide the heat necessary to sustain an endothermic catalytic steam reforming reaction in an adjacent channel of the same size even under the "worst case" conditions of heat loss existing in the ICR version 2 device. SR methane conversions as high as 98.6% with 66% selectivity to CO were observed.
3. Insufficient dispersion of combustion reactants across the combustion catalyst cross section (i.e. channeling) results in greatly reduced conversions in both the combustor and reformer.
4. The design of these ICR devices (versions 1 & 2) caused an unexpectedly large pressure drop in both the reformer (~3.3 bar or 48 psid) and combustor (~5.4 bar or 78 psid) sections when operated at temperature (~850-900° C.) with a 40 ms SR contact time.

Example 2

This example describes the design, fabrication, and test results from a high efficiency, high-throughput small microchannel reactor in which heat producing (exothermic) and heat consuming (endothermic) reaction channels are immediately adjacent (integrated). Combustion of hydrogen in air was used as the exothermic reaction, while steam reforming of methane with a steam to carbon ratio of 3:1 was used as the endothermic reaction. A new ICR design (flow-by) was used which allowed for much higher throughput with minimal (i.e. <11 psi) pressure drop by allowing each reactant stream to flow in a narrow (0.125 mm) gap adjacent to the porous engineered catalyst. The new design included a central combustion zone (of two microchannels) flanked by a reformer channel on either side.

Figure 13:
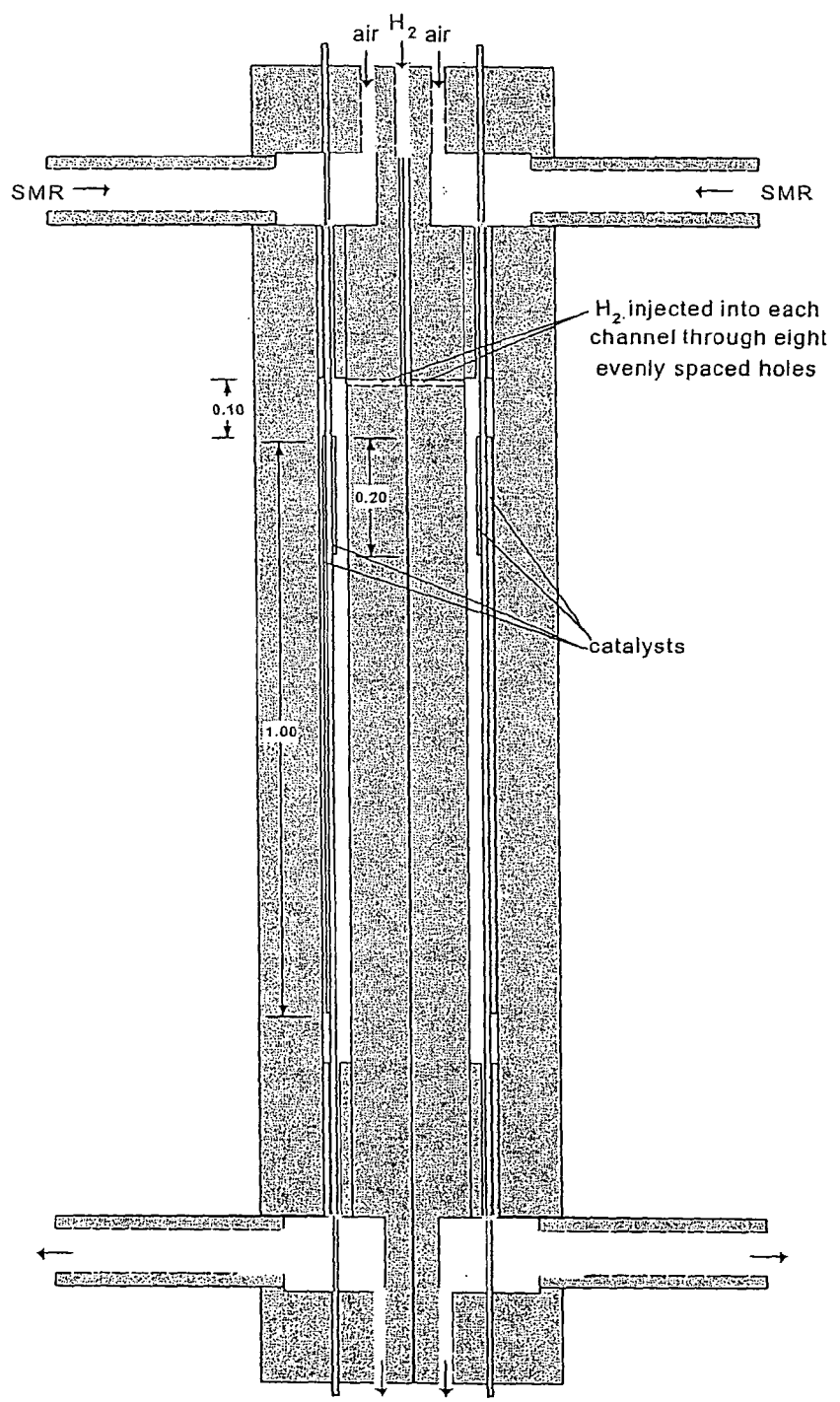
FIG. 13 is a schematic illustration of a reactor used in the Examples.

The ICR (see FIG. 13) used a shortened combustion catalyst bed (0.2", 0.5 cm) to allow a combination of catalytic and homogenous hydrogen combustion. Hydrogen was only distributed across the channel width, and not along the length of the catalyst bed. The entire hydrogen fuel stream was fed into the combustion channel through eight 0.009" (0.02 cm) holes 0.030" (0.08 cm) upstream of to the catalyst bed.

The dimensions of the steam reformer (SR) catalysts were 0.01"×0.5"×1.0" (0.25 mm×1.27 cm×2.54 cm) and the combustor (CR) catalysts were 0.01"×0.5"×0.2" (0.25 mm×1.27 cm×0.51 cm), although only 1.02 cm of the width was exposed to reactant flow, 0.12 cm on each edge being used to hold the catalyst in place on either side. For the purposes of heat flux calculations for this example, only 0.4 inches catalyst width was included as the remaining catalyst volume was occluded from reactant flow. A thickness of 0.012" (0.30 mm) was allowed for each catalyst, with flow-by channel thicknesses of 0.005" (0.13 mm) and 0.017" (0.43 mm) in the SR and CR channels, respectively. The ICR was operated in a co-flow configuration. The experimental setup used for testing was the same as that used in Example 1. The ICR was tested with both a stoichiometric amount of hydrogen in air and with 40% excess air in the CR channels while running methane steam reforming reaction in the SR channels.

Body temperatures were measured inside 1/16" (0.16 cm) deep thermowells at 3 positions along the length of the ICR unit on the back side of each reformer channel at positions corresponding to the top, middle, and bottom of the steam reformer catalyst bed. The combustor was tested for a range of contact times and air equivalence ratios using hydrogen in air supplied by Brooks mass flow controllers (MFC). The reformer was tested over a wide range of reformer contact times at an average temperature of about 750-800° C. Methane was supplied by a Brooks MFC and water was supplied by HPLC or syringe pump. Exit compositions were determined for both the combustor and reformer portions using an MTI GC. All tests were performed at ambient pressure using a 3:1 molar steam to carbon ratio.

A summary of the results of tests performed is shown in Table 3. The tests show a large drop (36-80° C.) in SR body temperatures along the length of the reactor, suggesting that the majority of the combustion occurs at the entrance of the combustion chamber (in the catalyst zone). It is noteworthy that the ideal region to supply heat to the reforming reaction is at the catalyst entrance, where the SMR reactant concentration gradient (and therefore the rate of reaction) is highest. The co-flow configuration of the ICR and SMR channels coupled with the fast kinetics of hydrogen combustion delivers the majority of the heat right at the catalyst bed entrance, thus maximizing the rate of SMR reaction.

TABLE 3

Summary of best results of tests using ICR device of example 2.

|  | 1 | 2 | 3 | 4 |
|---|---|---|---|---|
| CR H2 flow (sccm) | 316 | 632 | 767 | 857 |
| CR air flow (sccm) | 1028 | 2092 | 2682 | 2682 |
| Air inlet temperature (° C.) | 25 | 25 | 25 | 25 |
| Air inlet pressure (psig) | 2.0 | 4.9 | 6.7 | 6.7 |
| excess air | 37% | 39% | 47% | 31% |
| CR contact time (ms)[a] | 3.4 | 1.7 | 1.3 | 1.3 |
| CR flow time (ms)[b] | 17.0 | 8.4 | 6.6 | 6.4 |
| CR H$_2$ conversion | 92.8% | — | 92.3% | — |
| CR pressure drop (bar) | 0.14 | 0.34 | 0.46 | 0.46 |
| SR inlet temperature (° C.) | 622 | 544 | 571 | 511 |
| SR inlet pressure (psig) | 1.4 | 6.6 | 10 | 11 |
| SR CH$_4$ flow (sccm) | 55 | 231 | 462 | 462 |
| SR H$_2$O flow (sccm) | 149 | 673 | 1346 | 1346 |
| steam:C (mol:mol) | 2.7 | 2.9 | 2.9 | 2.9 |
| SR contact time (ms)[a] | 65 | 14.8 | 7.4 | 7.4 |
| T$_1$/T$_4$ (° C.)[c] | 770/820 | 768/859 | 705/813 | 715/825 |
| T$_2$/T$_5$ (° C.)[c] | 736/777 | 756/812 | 686/754 | 696/767 |
| T$_3$/T$_6$ (° C.)[c] | 731/757 | 754/793 | 683/733 | 694/745 |
| SR CH$_4$ conversion | 98.3% | 99.2% | 89.2% | 93.4% |
| SR selectivity to CO | 65.0% | 65.9% | 61.0% | 61.2% |
| avg. heat flux (W/cm$^2$) | 1.7 | 7.1 | 12.6 | 13.2 |
| avg. volumetric flux (W/cm$^3$) | 6.0 | 25.0 | 44.3 | 46.4 |
| SR pressure drop (bar) | 0.10 | 0.45 | 0.69 | 0.76 |
| SR carbon balance | 2.6% | 5.2% | −0.7% | −8.8% |

[a]Contact time based only on volume of channel and catalyst in region containing catalyst, 0° C., 1 atm.
[b]Flow time based on entire combustion chamber volume, including downstream of catalyst.
[c]Thermocouples are located down the length of the reactor, with the highest temperatures near the inlet of the co-flow reforming stream and combustion stream The device showed differences of over 50° C. in SR body temperatures at identical locations on each reformer channel, suggesting that the fuel or air is not uniformly distributed between the two combustor half-channels. The ICR device transferred up to 54.8% of the heat produced by the combustion into the endothermic reaction (it is estimated that about 40% of the energy produced was spent to heat the combustion products to 740° C.). Thus when operated at peak capacity, heat losses in the device were as low as 10% of the energy available at 740° C., demonstrating an incredibly high efficiency for such a small device. The calculated maximum average heat flux was 13.2 W/cm$^2$. This flux is higher than any reported in the literature for driving an endothermic reaction. It follows, then, that the flow-by ICR concept can be used to make high-throughput reactors which are much more compact and better performing than devices which use monolith or flow-through catalyst configurations.

Results from tests on the second type of integrated combustion reactor (ICR) show much higher efficiency than is possible with an external combustor (as high as 56.7% of combustion fuel energy were transferred to the steam reforming reaction, of the maximum possible of 60.4% deliverable at 740° C. with 92% combustion fuel conversion and 47% excess air). The heat flux was 13 W/cm$^2$, which is higher than any reported in the literature. For the conditions at which this heat flux occurred, the pressure drops measured across the combustor and reformer were 0.46 bar (6.7 psid) and 0.76 bar (11.0 psid), respectively. These results confirm that the flow-by catalyst configuration enables catalytic combustion heat transfer rates and efficiencies far above those in existing ICR-like devices. In contrast, the flow through (Example 1) device incurred pressure drops across the combustor and reformer of 5.3 bar (77 psid) and 5.0 bar (72 psid) at a heat flux of 3.0 W/cm$^2$.

Figure 14:
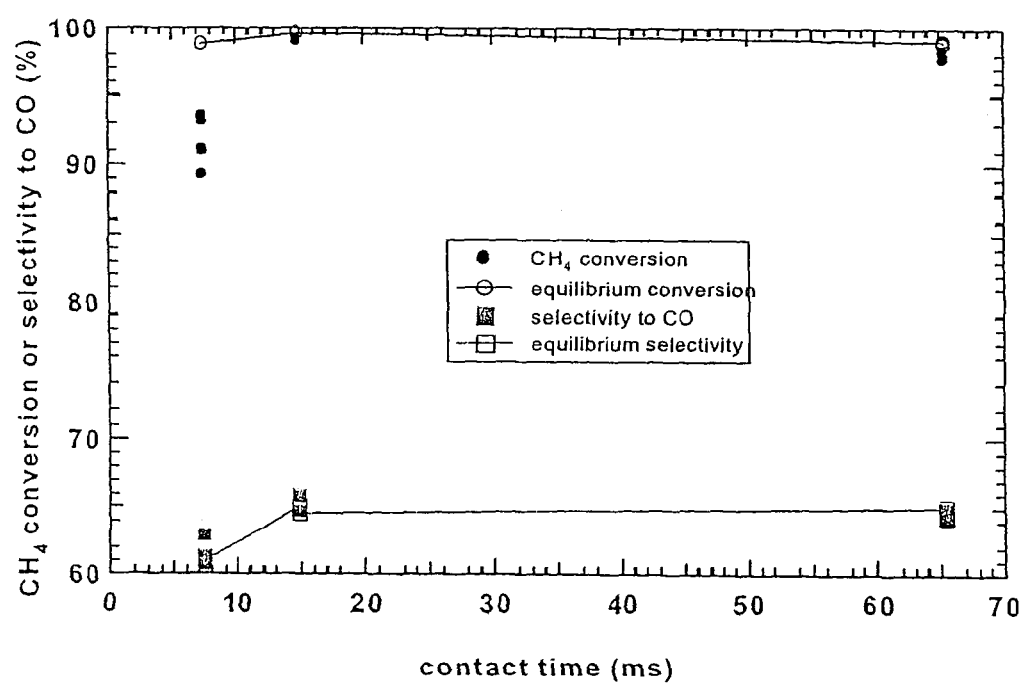
FIGS. 14-16 are data from the Examples.

Results typical of the reformer performance are shown in FIG. 14. Values of equilibrium selectivity to CO calculated for measured reactor temperatures (assumed to be equal to the average of all six body temperatures) were in good agreement with measured selectivity values. From the data in FIG. 14 it is clear that the ICR is able to achieve equilibrium conversion for reformer contact times of 15 ms, and nearly equilibrium conversion for a contact time of 7.5 ms.

Figure 15:
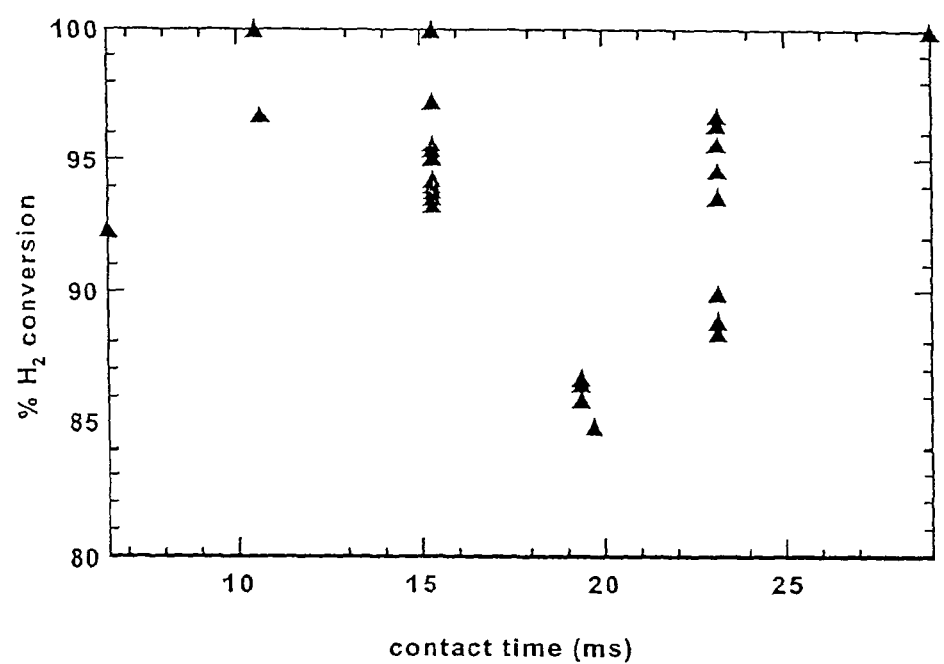
Figure 16:
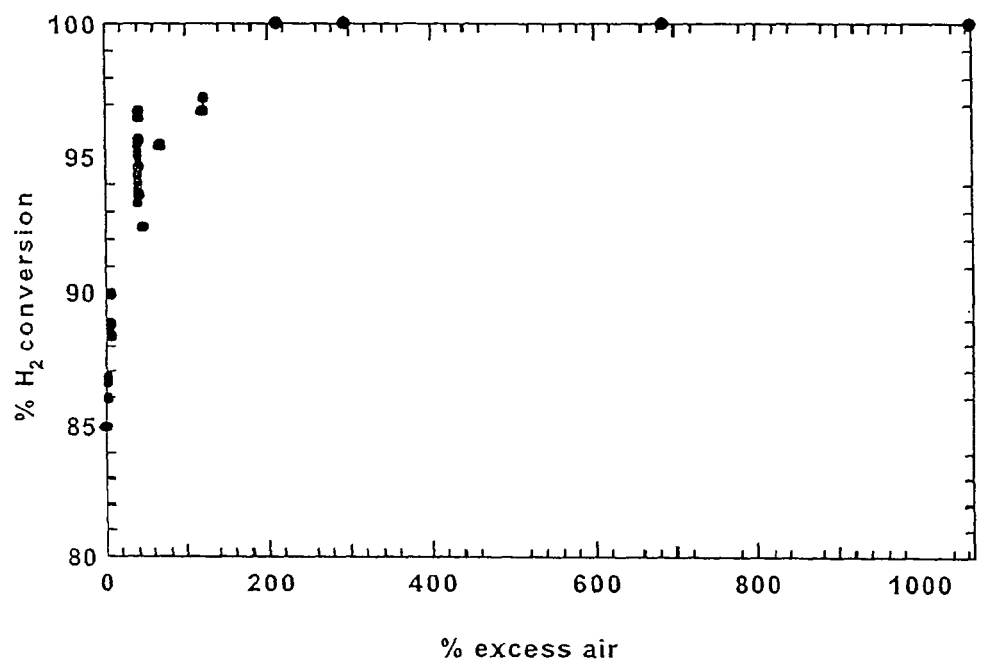

FIGS. 15-16 support the hypothesis that either the fuel or the air was not evenly distributed between the two half-channels. The data in FIG. 15 show that, for the range of contact times tested, no decrease in conversion is seen as contact time is shortened, suggesting that the limitation on conversion is not due to catalytic activity.

A strong trend in hydrogen conversion is seen with decreasing excess air, suggesting that below about 150% excess air, one of the combustion half channels may be running fuel rich, limiting the maximum achievable overall conversion.

The ICR was operated for a total of about 21 hours over 6 days, with no significant deactivation observed for either the combustor or reformer catalysts. During testing, the measured body temperatures never exceeded 860° C. and were typically 750-800° C.

Conclusions

1. An integrated combustor reactor (ICR) device was designed, fabricated and shown to be able to achieve a rate of heat transfer of 13.2 W/cm² with pressure drops of less than 0.76 bar (11 psid) and 0.46 bar (7 psid) in the reformer and combustor channels, respectively.
2. Equilibrium conversion and selectivity were achieved in this ICR device for whole channel reformer contact times as low as 15 ms, even though the combustion catalyst bed extended only ⅕ the length of the reformer catalyst bed.
3. After 21 hours of operation at 750-800° C., the single channel ICR device showed no significant signs of catalyst deactivation, even though the combustor was normally run with only 41% excess air (with some excursions to <3% excess air).

Because of the unusually high capacity of this "single channel" ICR device, heat losses as low as 10% of the total energy available at 740° C. were achievable.

Example 3

This example describes the design and testing of a multichannel interleaved microchannel reactor in which heat producing (exothermic) and heat consuming (endothermic) reaction channels are interleaved (integrated) with each other. Combustion of hydrogen in air was used as the exothermic reaction, while steam reforming of methane with a steam to carbon ratio of 2:1 was used as the endothermic reaction. The pressure for both reactions was near atmospheric and operated at a pressure required to overcome the system pressure drop. For the SMR side, the typical operating pressure was 139 kPa (5.5 psig) and for the combustion side the typical operating pressure was also 137 kPa (5.2 psig). A flow-by design (flow-by) was used which allowed for much higher throughput with minimal (<0.2 bar, or 3 psid) pressure drop by allowing the reactant stream in each channel (whether exothermic or endothermic) to flow in a narrow (about 0.2 mm) gap between two layers of porous engineered catalysts which are in intimate thermal contact with the solid channel wall or heat transfer surface. The reactants substantially diffuse from the gap to the porous engineered catalyst. The reactants then continue to diffuse and react within the porous engineered catalyst that is adjacent to the heat transfer surface. The design included nine combustion channels interleaved between ten reformer channels in a co-flow arrangement. The integrated combustion reactor (ICR) test results demonstrate that the ICR concept can be scaled up for use in a multichannel device.

An ICR device body was fabricated from Inconel 625 by using wire EDM to form slots in a block of solid metal. The device was made from a 5.33 cm (2.1") long by 5.23 cm (2.06") tall by 2.54 cm (1.0") wide block. Nine combustion channels were machined 5.3 cm through the block's length by wire EDM, with each channel having an overall width of 1.78 cm (0.7") and 0.081 cm (0.032") height. Each combustion channel was centered in the 2.5 cm width of the block. Interleaved between the nine combustion channels were eight SMR channels, and bracketing these interleaved channels were two smaller SMR channels, ensuring a heat sink on both sides of each combustion channel. All the SMR channels in the block were 4.57 cm (1.8") in length, with the channel starting 0.25 cm (0.1") from the side combustion reactants enter and 0.51 cm (0.2") from the exit of the combustion channels. The eight SMR channels had heights of 0.081 cm (0.032"), while the two smaller bracketing SMR channels had heights of 0.043 cm (0.017"). The separation between all SMR and combustion channels was maintained by heat transfer webs of 0.15 cm (0.060") thickness, and the interleaved channels were centered within the 5.23 cm of the device's height. The general channel orientation and the interleaved nature of the channels are both illustrated in FIG. 17.

Fluid access to the SMR channels is through the sides where the channels are machined through in a direction perpendicular to the combustion channels. To cause the SMR flow in each channel travel concurrently with the combustion channels, two 4.01 cm (1.6") by 0.38 cm (0.15") side pieces were made for each SMR channel with heights matching the SMR channel heights (press-fit). For each SMR channel, one of these side pieces was placed 0.38 cm into the channel and positioned such that a 0.51 cm opening was left upstream of the catalyst for reactant gas to pass through from the header, while another was placed on the opposite side, leaving a similar opening downstream of the catalyst to allow gases to leave the footer. These openings start 0.25 cm from the combustion inlet side of the block. The flow-by SMR engineered catalysts are then inserted into the SMR channels, of length 3.57 cm (1.4"), 1.78 cm (0.7") width and 0.03 cm (0.012") thickness. Two SMR engineered catalysts go into each of the eight center channels up against both heat transfer surfaces, resulting in a gap of is 0.02 cm (0.008"). A single SMR engineered catalyst goes into the two bracketing SMR channels, places against the heat transfer surface it shares with the combustion channel, leading to a 0.012 cm (0.005") gap. The catalysts are centered within the 4.57 cm length and 2.54 cm width of each SMR channel. To maintain the flow-by gap mentioned above and keep the engineered catalysts against the channel wall, two 3.57 cm (1.4") length, 0.13 cm (0.05") width Inconel 625 strips were placed between the two engineered catalysts, with the thickness of the two strips equal to the gap height design. These two strips are aligned with their lengths corresponding to the engineered catalyst lengths, and are placed at the edges of channels the two engineered catalysts form. The final step involves placing the other side piece in 0.38 cm into the width of each SMR channel on the opposite of the first piece. The placement creates a 0.51 cm length opening for SMR products to leave the channel, and this opening is 0.51 cm length from the edge that combustion products leave the device. The overall effect of the addition of the two side are to build a z-shaped manifold for flow through the channel created by the SMR catalyst gap. A drawing that illustrates the shape of the flow path for the SMR channels is found in illustration 18.

The SMR manifold that distributes the SMR streams from a single inlet pipe to the ten overall channels is made from a single block of material 5.08 cm (2.0") long, 4.71 cm (1.858") tall and 0.95 cm wide (0.375"). In this block individual circular cylinder channels lead from the openings mentioned in the preceding paragraph to a half tube welded over the opening. The SMR manifold that takes the outlets from each stream into a single outlet tube has a similar design, with its connection cylinders matching to the outlet channels.

The nine combustion channels each had two combustion engineered catalysts of the same dimensions as the SMR catalysts, and used the same dimensions for the strips used for separation in the SMR channels. The combustion engineered catalysts are pushed into the length of each channel 0.76 cm (0.3") from the side the combustion reactants enter, and by doing so ensure the SMR and combustion engineered catalysts surface areas are aligned for optimal heat transfer.

Figure 17:
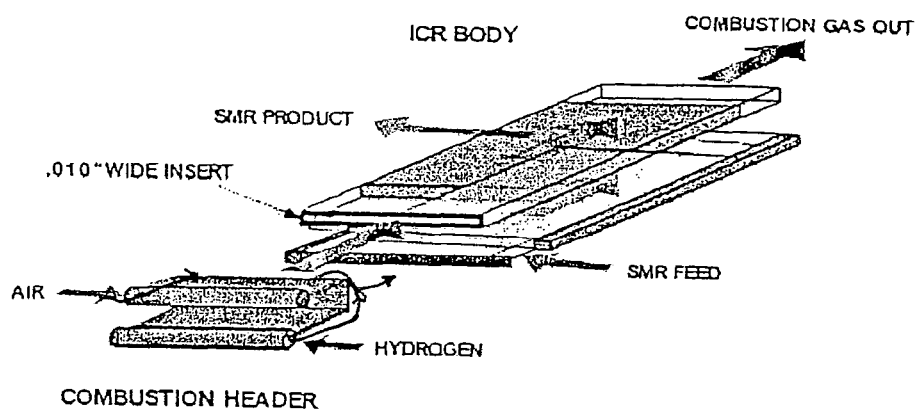
FIGS. 17-20 illustrate reactor designs of reactors described in the Examples.
Figure 18:
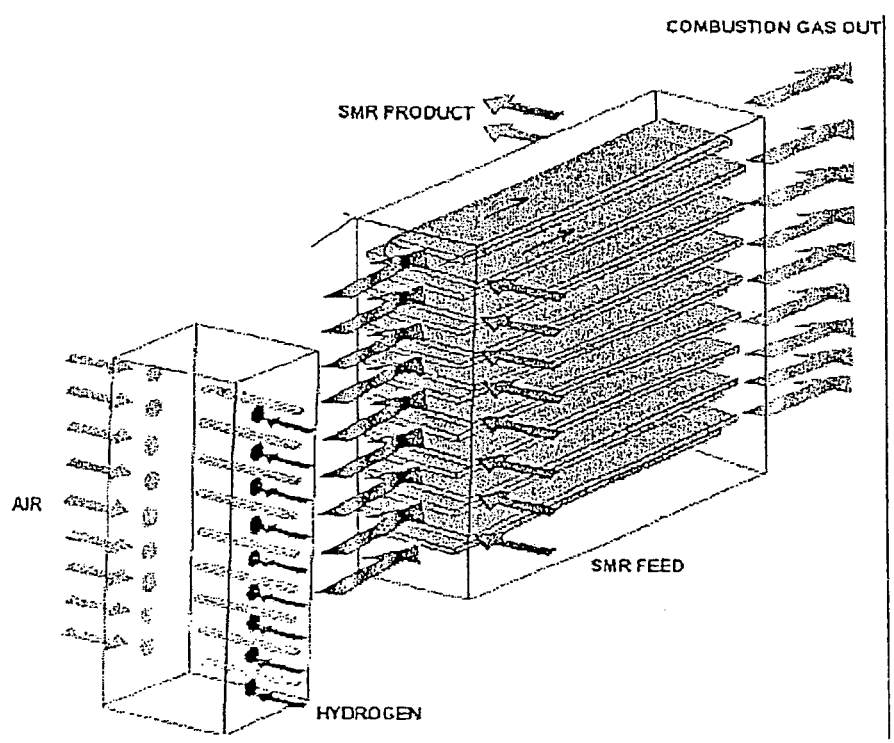

The combustion gas manifold that brings in the fuel (hydrogen) and air must distribute air and fuel equally to the nine channels while keeping the two combustible streams separate until meeting at the combustion channel entrance. This is accomplished by taking a 1.27 cm (0.5")×5.23 cm (2.058")×2.54 (1") cm wide block of Inconel 625 and using a wire EDM to machine 1.27 cm×1.78 cm×0.03 cm through-channels, one for the air and fuel for each channel. A single air channel lines up with the entrance of each combustion channel, while a single fuel channel is a height 0.193 cm (0.076") beneath it. The two channels connect at the combustion channel entrance by use of a 0.038 cm (0.015") length channel machined into the plane that interfaces the combustion channel. This allows the fuel to make a 90° turn and travel in the machined-in pocket at the interface with the main body to meet the incoming air stream, where mixing occurs, as noted in FIG. 18.e The fuel and air channels thus made from wire EDM are closed with welds on the surface opposite the interface with the reactor body. The manifold for delivering air from a single inlet tube into the wire EDM created channels is created by machining in 0.25 cm (0.100") diameter tubes that extend in from the side of the block. These tubes extend in 2.16 cm of width from the side, creating an individual manifold for air across the combustion channel. These individual channel manifolds are connected with a single tube to the inlet. The manifold for the fuel has a similar design. The overall manifold is shown in FIGS. 17 and 18.

The manifold for the combustion product to a single outlet tube was made from an Inconel 625 block of 0.95 cm long (0.375"), 4.71 cm (1.858") tall and 2.29 cm wide (0.9"). The manifold is a large open space of 0.200" length for flow to collect into, with a 0.46 cm (0.18") diameter outlet on the bottom side of the face opposite the interface with the reactor.

Gaseous reactants were metered from pressurized cylinders via Brooks mass flow controllers, while water was delivered via high pressure liquid (HPLC) pump. An external combustor and heat exchange network was used to continuously vaporize the feed water, preheat the steam reforming reactants to 500-600° C., and to preheat the combustion air to 500° C. Device body temperatures were measured in thermowells (drilled into selected webs between channels) using 0.032" type K thermocouples and recorded using an Iotech data logging system. Inlet and outlet gas pressures were measured for the combustion and reforming streams via calibrated pressure transducers. Gas temperatures were also measured via thermocouple at the combustion gas inlet and outlet and at the reformer gas inlet and outlet. The product gases were cooled in water-cooled condensers and the dry exit flow measured in a dry test meter. Dry product gas compositions ($H_2$, CO, $CO_2$, $CH_4$, $O_2$, and $N_2$) were measured using an online gas chromatograph. All device ICR tests were performed using a 2:1 molar steam to carbon ratio.

Catalysts were reduced prior to the first day of testing at 125° C. for 1.5 hours. Startup of the device ICR was accomplished in several steps. First an inert flow (nitrogen, 1-5 SLPM) was initiated in both the combustion and reforming channels. Next the external combustor was ignited to provide water vaporization and preheat in external microchannel based heat exchangers. Then the nitrogen flow to the combustor was shut off and the air flow initiated. Hydrogen was then introduced to the combustion channels as about 3% of the total flow, causing catalytic ignition of the combustion reactants. Next the hydrogen content was slowly ramped up to bring the reactor temperature to about 700° C. Then a small hydrogen flow was introduced into the reforming channels to prevent catalyst oxidation by steam, water was fed through the vaporizer, thus providing steam to the reforming channels. Finally, the reformer nitrogen was turned off and methane was introduced into the reformer and the reformer hydrogen was turned off. Once the reforming reaction began, additional hydrogen was fed to the combustion channels to maintain the reactor temperature between 750 and 850° C. Changes in process flows made during steady-state operation were performed in a balanced fashion (changing both the reforming and combustion flows at the same time) to prevent large transient deviations of the device ICR temperature from the desired operating temperature.

A summary of the results of tests performed using the device ICR at near ambient pressure is shown in Table 4. Note, in Table 4, that since the combustion air was preheated to 500° C. and a low percentage of excess air (48-75%) was used, adiabatic flame temperatures inside the combustion channels would theoretically exceed 2100° C. However, maximum measured temperatures inside the device ICR were well below 950° C., demonstrating the effectiveness of the ICR concept in transferring heat away from the combustion channels and into the endothermic reaction. Also note in Table 4 that high heat fluxes (nearly 3 W/cm²) and high conversions can be achieved even at very short contact times (as low as 33 ms). Contact time is defined here as the total channel volume (within which the catalyst and flow-by area are contained) divided by the total volumetric inlet flow rate (converted to standard conditions, 0° C. and 1 atm). Even for the very fast contact times of the data shown in Table 4, pressure drop is minimal (about 0.14-0.21 bar), demonstrating the distinct advantage of the flow-by arrangement in the ICR.

TABLE 4

Summary of best results for high-throughput tests using ICR device of Ex. 3.

| | Experiment 1 | Experiment 2 |
|---|---|---|
| air inlet T (° C.) | 493 | 494 |
| air inlet pressure (psig) | 5.2 | 4.16 |
| air inlet pressure ($Pa/10^5$) | 1.4 | 1.3 |
| fuel inlet temperature (° C.) | 25 | 25 |

TABLE 4-continued

Summary of best results for high-throughput
tests using ICR device of Ex. 3.

|  | Experiment 1 | Experiment 2 |
| --- | --- | --- |
| $CR^a$ H2 flow (SLPM) | 2.4 | 3.4 |
| $CR^a$ CH4 flow (SLPM) | 0 | 0 |
| CR air flow (SLPM) | 10 | 12 |
| excess air | 75% | 48% |
| CR max. meas. temperature (° C.) | 916 | 903 |
| CR contact time (ms) | 22.4 | 18 |
| CR GHSV (per hour) | 160714 | 200000 |
| CR $H_2$ conversion | 99.4% | NM |
| CR pressure drop (psi) | 2.3 | 3.2 |
| CR pressure drop ($Pa/10^5$) | 1.2 | 1.2 |
| SR preheat T (° C.) | 515 | 568 |
| SR inlet pressure (psig) | 3.0 | 5.5 |
| SR inlet pressure ($Pa/10^5$) | 1.2 | 1.4 |
| $SR^a$ $CH_4$ flow (SLPM) | 1.54 | 2.79 |
| SR $H_2O$ flow (SLPM) | 3.11 | 5.61 |
| steam:C (mol:mol) | 2 | 2 |
| SR contact time (ms) | 60 | 33 |
| CR GHSV (per hour) | 60000 | 109091 |
| SR body temperature (° C.) | 780 | 770 |
| SR $CH_4$ conversion | 82.3% | 70.7% |
| SR selectivity to CO | 76.3% | 77.6% |
| SR pressure drop (psi) | 1.8 | 3.3 |
| SR pressure drop ($Pa/10^5$) | 1.1 | 1.2 |
| avg. heat flux ($W/cm^2$) | 1.8 | 2.8 |
| avg. volumetric heat flux ($W/cm^3$) | 8.9 | 13.5 |

$^a$CR refers to combustion process side; SR refers to reforming process side.

This ICR device was designed to show proof of principle of the ICR concept in a multiple channel device and is not an optimized prototype. Optimization of inlet and outlet manifolds, as well as channel geometry, is expected to allow increased capacity and/or decrease the pressure drop penalty. Measurements of methane conversion in the device ICR (reformer channels) were conducted for a variety of combustion channel air equivalence ratios. Air equivalence ratios are defined as the ratio of available combustion oxygen to that required for stoichiometric combustion. It was observed that methane conversion gradually decreased with increasing air equivalence ratio from about 83% conversion at a 1.75 air equivalence ratio to about 63% conversion at a 7.0 air equivalence ratio. Although some coking of the reforming catalyst was observed when reforming reactant preheat was allowed to drop below 500° C., activity was completely restored after burning out the coke with air and re-reducing the catalyst. The ICR device was operated for over 10 hours including 3 thermal cycles.

In summary, a multi-channel integrated combustor reactor device was designed, fabricated and shown to be able to achieve a rate of heat transfer of 2.8 $W/cm^2$ and a volumetric heat flux of 13 W/cm3 with pressure drops of less than 0.23 bar and 0.19 bar in the reformer and combustor channels, respectively. High conversion (70-82%) was achieved in this ICR device for whole channel reformer contact times of 33-60 ms. After >10 hours of operation at 750-850° C., the device ICR device showed no significant signs of catalyst deactivation, even though the combustor was run with 75% excess air or less for more than 1.5 hours.

Example 4

An integrated-combustion microchannel reactor capable of providing exceptionally high heat fluxes (up to 29 $W/cm^2$ and 118 $W/cm^3$) to a highly endothermic reaction with minimal pressure drop was designed, fabricated, and demonstrated. This report describes the design and testing of this multichannel interleaved microchannel reactor in which heat producing (exothermic) and heat consuming (endothermic) reaction channels were interleaved (integrated) with each other. Combustion of hydrogen in air was used as the exothermic reaction, while steam reforming of methane (SMR) with a steam to carbon ratio of 2:1 was used as the endothermic reaction. A flow-by design was used which allowed for much higher throughput with minimal (<0.34 bar) pressure drop by allowing the reactant stream in each channel (whether exothermic or endothermic) to flow in a narrow (about 0.3 mm) gap between two layers of porous engineered catalyst which are in intimate thermal contact with the solid channel wall or heat transfer surface. The design included five combustion channels interleaved between six reformer channels in a co-flow arrangement. The test results demonstrate that microchannel integrated combustion devices can be used to deliver much higher volumetric heat fluxes (i.e. 118 $W/cm^3$) than is possible in conventional reformers and these heat fluxes can be achieved with minimal pressure drop (0.28-0.34 bar). High conversions were also possible at very high gas hourly space velocities (e.g., $10^6$ $hr^{-1}$) were achieved.

Gas hourly space velocity is defined as the number of SMR reactor core gas volumes (defined at 0° C. and 1 atm) that would pass through the SMR catalyst containing channels each hour. The space velocity can be calculated by dividing $3.6 \times 10^6$ by the contact time in milliseconds, both being defined at STP 0° C. and 1 atm. The reactor volume for use in all volumetric heat flux calculations includes the entire core reactor volume that is inclusive of all reformer channels including catalysts, all metal webs between reformer and combustion channels, and all combustion channels used to supply heat. The external packaging is not included as this volume does not contribute to the transfer of heat between the two fluid streams.

Experimental Method

Figure 19A:
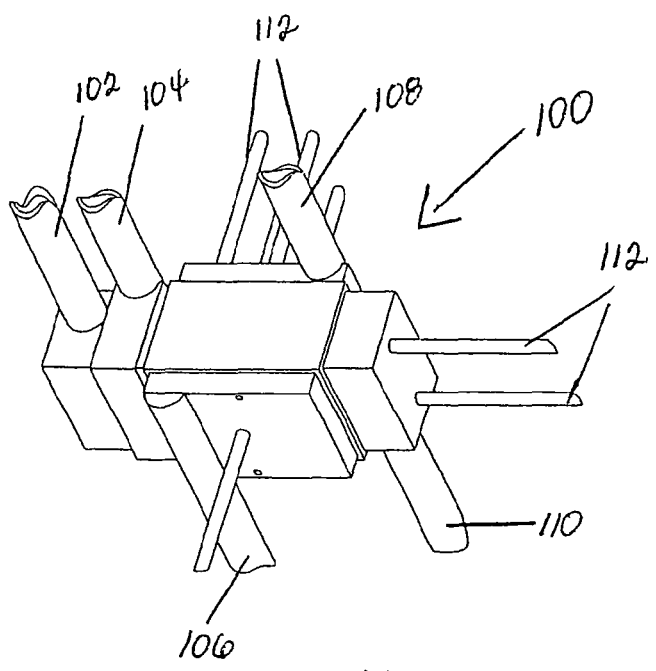
Figure 19B:
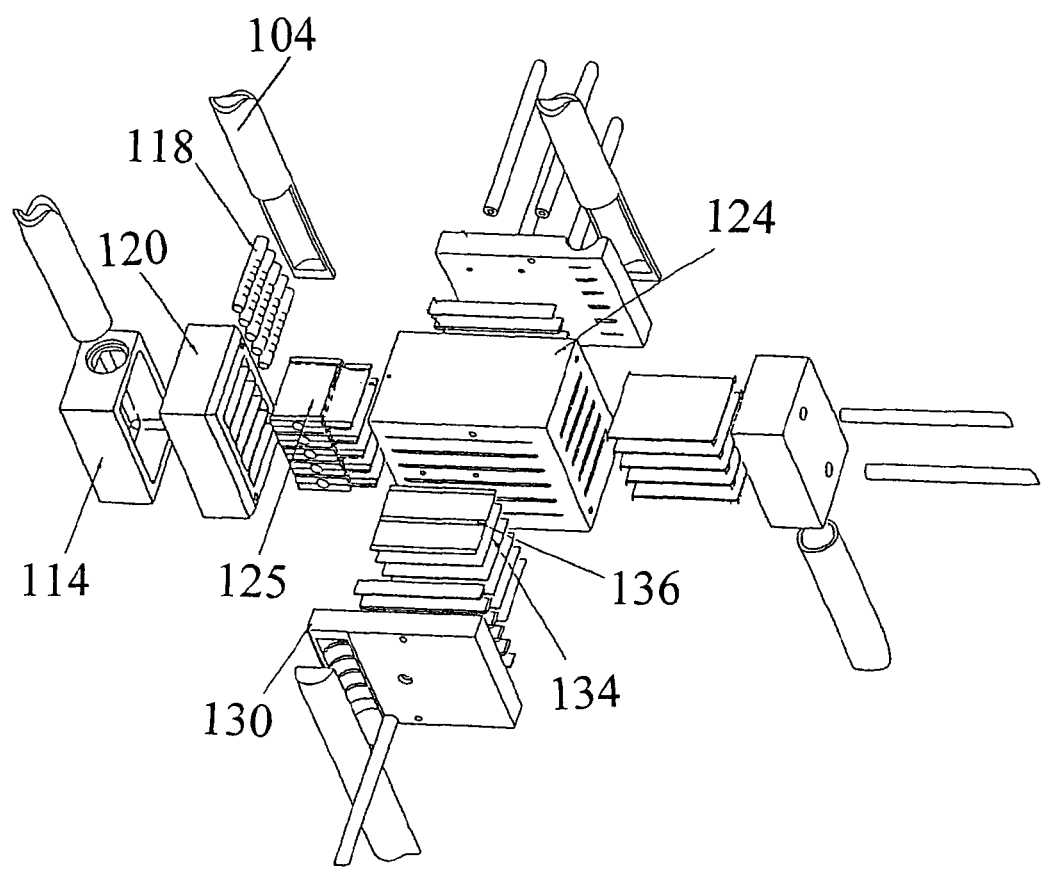
Figure 19C:
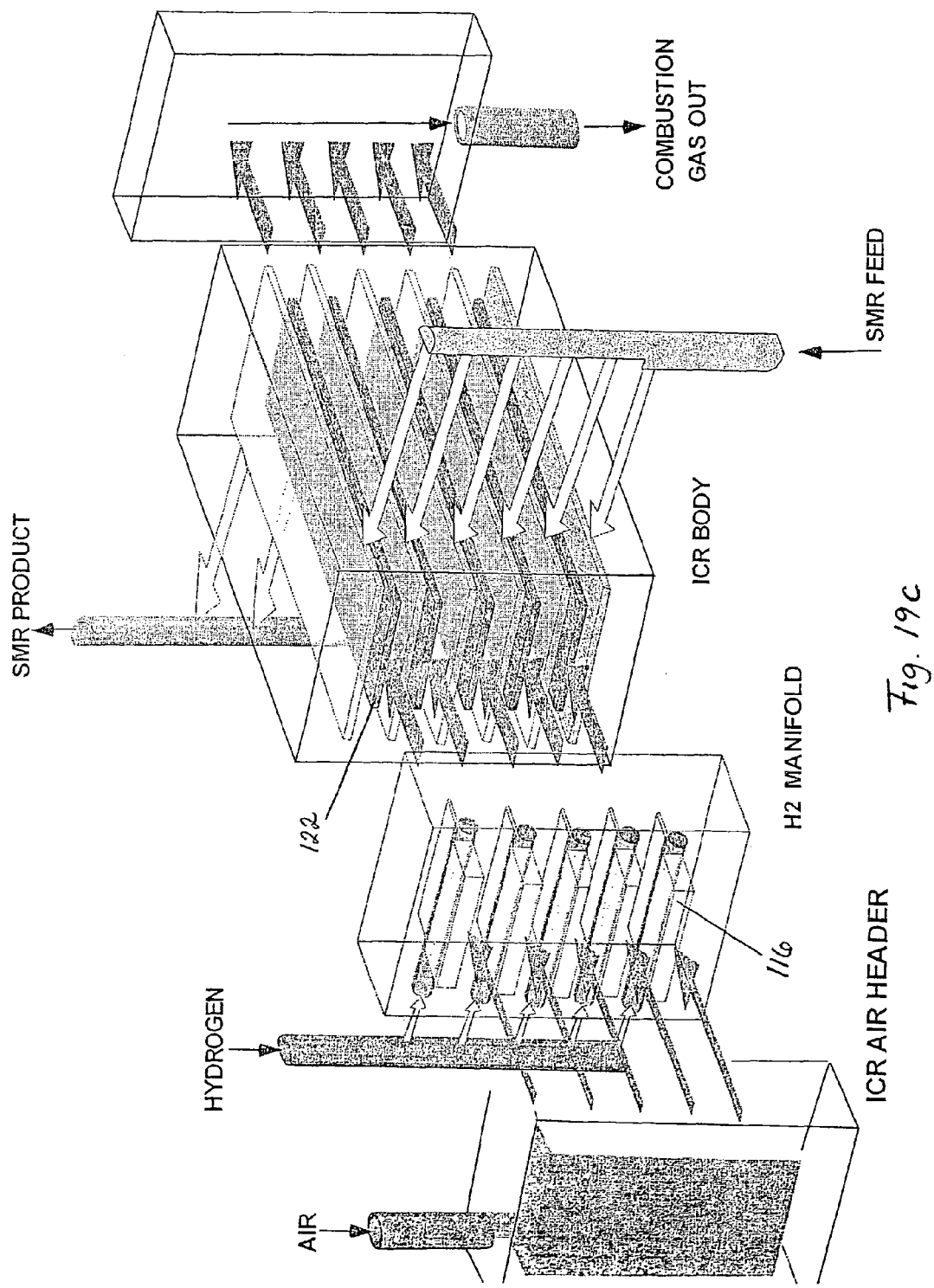
Figure 19:
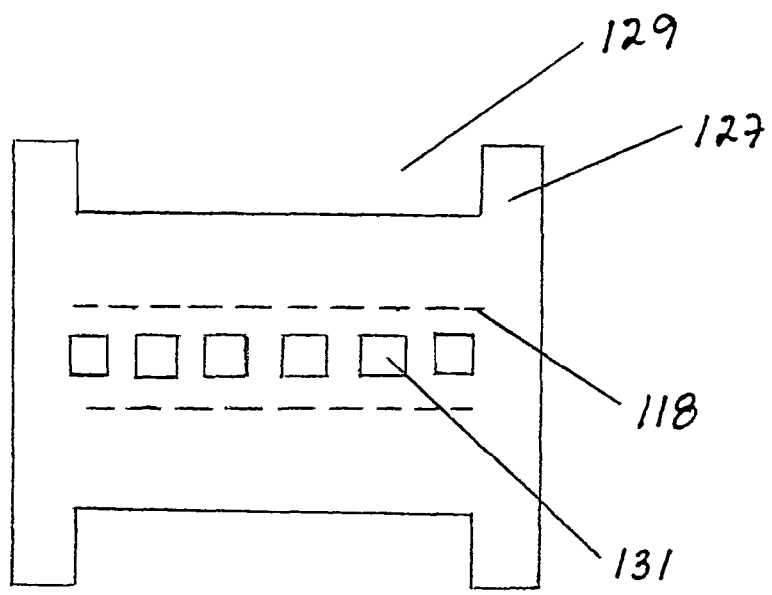
Figure 19E:
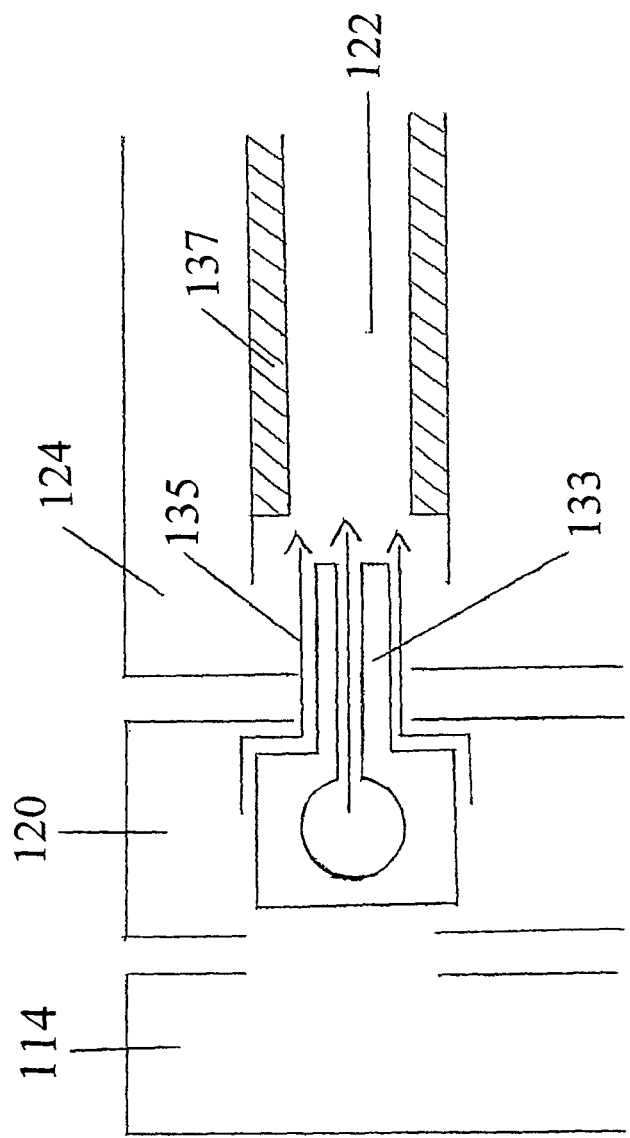
Figure 20:
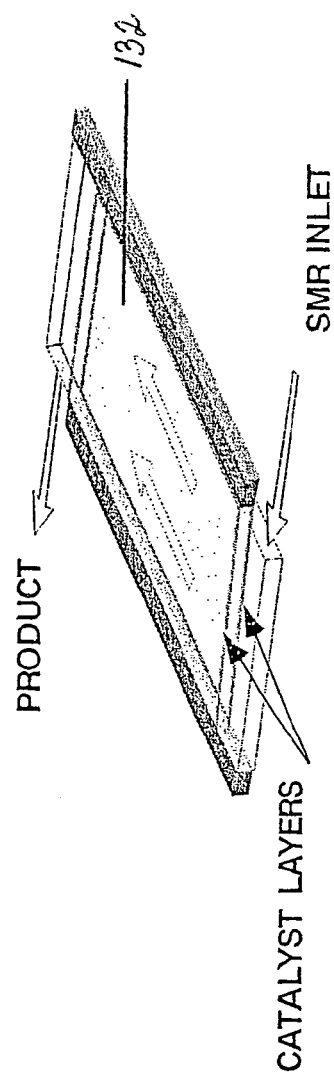
Figure 21:
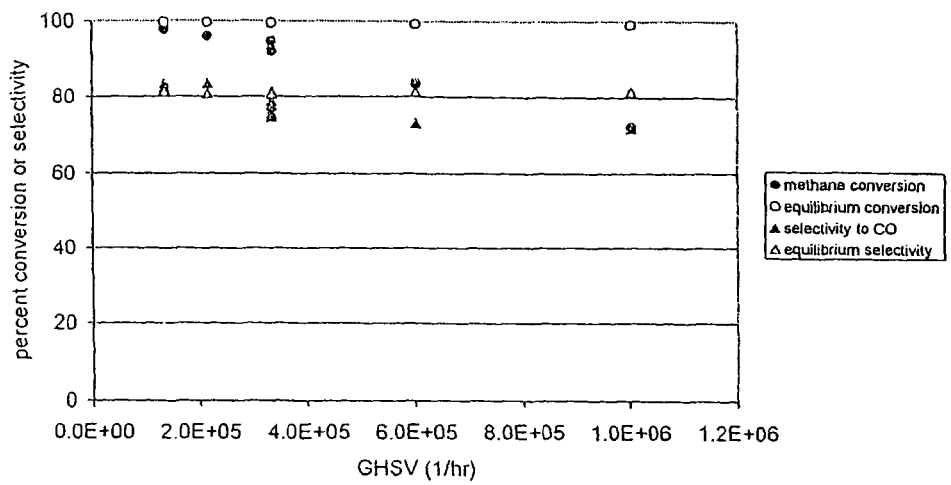
FIGS. 21-24 are data from the Examples.

A high heat flux multi-channel reactor device with integrated combustion was designed, fabricated, and tested. The device body was fabricated from Inconel 625 using wire EDM to form slots in a 1 inch by 1.37 inch by 1.7 inch (2.5 cm×3.48 cm×4.3 cm) solid block of metal. External cover plates containing the inlet and outlet gas manifolds (i.e. headers and footers) were independently machined and welded onto the body. Each header was designed to distribute the flow evenly from channel to channel and within each channel. A drawing of the exterior of this device is shown in FIG. 19a including air inlet 102, hydrogen inlet 104, reformer feed inlet 106, reformer product outlet 108, and combustor outlet 110. For testing purposes, temperature monitoring was accomplished via thermocouples 112. All the small tubes 112 in FIG. 19 are thermocouple tubes. FIGS. 19b and 19c show exploded views of the integrated reformer. Air is fed into header 114 and distributed at equal pressure into slots 116 at equal pressure through each slot. Similarly, hydrogen is fed through inlet 104, and at equal pressure into each tube, into slotted tubes 118. The tubes 118 extend from the hydrogen inlet into manifold body 120. Schematic views of a gas mixer 125 is shown in FIGS. 19d and 19e (which are not drawn to scale). Projections 127 define a gap 129 for air flow. Hydrogen exiting from slots 131 passes through channel 133 and mixes with air in combustion chamber 122 inside reactor body 124. As can be seen, this design mixes air and fuel inside the combustion chamber and very near combustion catalyst 137; thus avoiding heat loss from combustion outside the combustion chamber. Steam reformer feed is fed into header 130 and passes, at equal pressure, into the front of the steam reformer chambers. An illustration of the reformate flow through an individual chamber 132 is shown in FIG. 20. Plates 134 have supports 136 that press the reformer catalyst against the top and bottom of the reformer chamber.

The main body of the device of example 4 was identical to the main body of the device of example 3 except that there were four fewer SMR and four fewer combustion channels, and the catalyst length in the flow direction was only 1.0 inch rather than 1.4 inches. The dimensions of the SMR slots were 0.035 inches (0.89 mm) thick by 0.7 inches (17.8 mm) wide by 1.0 inch (25.4 mm) long. There were 6 SMR slots. The dimensions of the combustion slots were 0.038 inches (0.97 mm) thick by 0.7 inches (17.8 mm) wide by 1.0 inch (25.4 mm) long. There were 5 combustion channels. The channels were interspersed such that the outermost channel was a reforming half channel adjacent to a combustion channel, then adjacent to a full reforming channel and so on, in the same fashion as the device of example 3. The reforming half channel was 0.018 inch (0.46 mm) thick by 0.7 inches (17.8 mm) wide by 1.0 inch (25.4 mm) long. The half channel only contained one catalyst insert that was placed next to the wall shared with the combustion channel. The full reforming channels contained two engineered catalysts which were placed adjacent to each channel wall.

The exothermic and endothermic reaction channel flows are in the same direction (co-flow), although in this design, the reformer flow enters and leaves in a direction perpendicular to the direction of flow during reaction to accommodate manifolding connections on a different face of the device than the combustion flow manifolding, just as was done for the device of example 3. Note that the catalytic combustion was most likely accompanied by some homogeneous combustion in the flow-by gap. During testing, the device was insulated with ceramic fiber insulation. Two replicates of the reactor were fabricated and tested, achieving a combined time on stream of over 300 hours.

Both endothermic (combustion) and exothermic (SMR) reactions were catalyzed by engineered catalyst inserts 134, 14 measuring 0.011" by 0.7" by 1.0" (0.028 cm×1.8 cm×2.5 cm) held against the channel walls with 0.050" (1.3 cm) wide strips of Inconel 625 metal inserted in the flow-by gap along each edge and down the center. [134 and 136 of FIG. 19b are the SMR catalyst and spacers, respectively. 14 is the combustion catalyst. There are equivalent spacers between sets of combustion catalysts (not shown)] The flow-by gaps in each combustion channel were about 0.016" (0.041 cm) high, while the flow-by gaps in the SMR channels were about 0.013" (0.033 cm) high and 0.009" (0.02 cm) high for the full and half capacity channels respectively. The outermost SMR channels were sized to have half the flow of the inner channels since the outer channels received only half of the heat. The thickness of these outermost channels were 0.018 inches and they contained an 0.011 inch engineered catalyst. After catalyst insertion, 8 and 11 (FIG. 19b), were press-fit along each side of each SMR channel to direct the flow into and out of the header and footer areas and prevent bypass of the catalyst outside of the flow-by gap. Each outermost channel had catalyst only against the innermost wall and was designed to admit roughly half the flow going through a full channel for a given pressure drop.

Gaseous reactants were metered from pressurized cylinders via Brooks mass flow controllers, while water was delivered via high pressure liquid (HPLC) pump. An external combustor and heat exchange network was used to continuously vaporize the feed water, preheat the steam reforming reactants to ~800-845° C., and to preheat the combustion air to ~500-650° C. Device body temperatures were measured in thermowells (drilled into selected webs between channels) using 0.032" type K thermocouples and recorded by Labview with a data logging system. Inlet and outlet gas pressures were measured for the combustion and reforming streams via calibrated pressure transducers. Gas temperatures were also measured via thermocouple at the combustion gas inlet and outlet and at the reformer gas inlet and outlet. The product gases were cooled in water-cooled condensers and the dry exit volumetric flow was measured in a dry test meter. Dry product gas compositions ($H_2$, CO, $CO_2$, $CH_4$, $O_2$, and $N_2$) were measured using an online MTI GC. SMR performance was evaluated using a 2:1 molar steam to carbon ratio. Gaseous hourly space velocity (GHSV) was calculated based on the entire channel volume within which flow was exposed to catalyst (including the catalyst, spacer strips, and flow-by volume) based on volumetric flows defined at 0° C. and 1 atm. Heat flux is calculated by determining the amount of heat transferred into the endothermic steam reforming reaction. For a known molar flowrate of reforming reactant, a known amount of conversion is measured through a GC analysis of the effluent composition and the outlet product flowrate. From the total number of moles converted, the total heat required is calculated. Heat flux values were calculated as an average over the entire wall area in contact with SMR catalyst. Calculated average area heat flux values were based on only the required SMR reaction heat duty for the measured SMR conversion and selectivity. Calculated volumetric heat flux values were based upon the entire volume containing both the reforming and combustion catalysts and respective gaps, including walls between channels, but not including any perimeter metal. This volume is inclusive of the entire volume through which heat is transferred between the two fluids.

Catalysts were reduced during the first day of testing at 125 C for 1 hour. Startup of the device ICR was accomplished in several steps. First an inert flow (nitrogen, 1-5 SLPM) was initiated in both the combustion and reforming channels. Next an external combustor was ignited to provide a hot flow of combustion products sufficient to transfer heat in this external heat exchanger to vaporize water required for the reforming reaction and to supply required reactant preheat. Then the nitrogen flow to the combustor was shut off and air flow was initiated. Hydrogen was then introduced to the combustion channels as about 3% of the total flow, causing catalytic ignition of the combustion reactants. Next the hydrogen content was slowly ramped up to bring the reactor temperature to about 700° C. Then a small hydrogen flow was introduced into the reforming channels to prevent catalyst oxidation by steam, and water was fed through the vaporizer, thus providing steam to the reforming channels. Finally, the reformer nitrogen was turned off, methane was introduced into the reformer, and the reformer hydrogen turned off. Once the reforming reaction began, additional hydrogen was fed to the combustion channels to maintain the reactor temperature between 750 and 850° C. Changes in process flows made during steady-state operation were performed in a balanced fashion (changing both the reforming and combustion flows at the same time) to prevent large transient deviations of the device ICR temperature from the desired operating temperature. Combustion was performed in FDR with excess air values as low as 13%.

This device was operated near atmospheric pressure on both the reforming and combustion reaction. The typical operating pressure on the reforming side was 10 psig. The typical operating pressure on the combustion side was 10 psig. Air and fuel inlet pressures were similar.

Results and Discussion

Results of tests using the high heat-flux integrated combustion microchannel reactor are shown in Table 5 and FIGS. 21-24. Methane conversions approach equilibrium conversion and selectivity to carbon monoxide and hydrogen even at very high space velocities (up to $10^6$ $hr^{-1}$, see FIG. 21).

ume suggests potential for substantial savings in reactor materials and catalyst costs per unit volume of syngas produced.

Conclusions

An integrated-combustion microchannel reactor has been designed, fabricated and tested which can achieve high methane conversions at heat fluxes as high as 29 $W/cm^2$ and volumetric heat fluxes of 118 $W/cm^3$ with pressure drops of less than 4 psi and 5 psi in the reformer and combustor sides,

TABLE 5

Summary of best results of tests using ICR device of Ex. 4

|  | Test 1 | Test 2 | Test 3 | Test 4 | Test 5 | Test 6 | Test 7 |
| --- | --- | --- | --- | --- | --- | --- | --- |
| air inlet temperature (° C.) | 619 | 630 | 638 | 635 | 615 | 644 | 661 |
| air inlet pressure (psig) | 9.3 | 5.0 | 5.3 | 5.0 | 9.8 | 8.4 | 15.8 |
| air inlet pressure ($Pa/10^5$) | 1.7 | 1.4 | 1.4 | 1.4 | 1.7 | 1.6 | 2.1 |
| fuel inlet temperature (° C.) | 363 | 363 | 382 | 483 | 422 | 348 | 343 |
| H2 flowrate (SLPM) | 5.30 | 4.7 | 4 | 2.4 | 3.6 | 6.3 | 9.5 |
| Air flowrate (SLPM) | 29.5 | 20 | 11.4 | 12 | 20 | 17 | 30 |
| % excess air | 134% | 79% | 20% | 110% | 133% | 13% | 33% |
| CR contact time (msec) | 3.8 | 5.3 | 8.5 | 9.1 | 5.5 | 5.6 | 3.3 |
| CR GHSV (per hour) | 958027 | 679979 | 423954 | 396425 | 649696 | 641438 | 1087416 |
| air pressure drop (psi) | 4.3 | 3.7 | 2.0 | 2.4 | 3.2 | 3.3 | 4.6 |
| air pressure drop ($Pa/10^5$) | 1.3 | 1.3 | 1.2 | 1.2 | 1.2 | 1.2 | 1.3 |
| SR inlet temperature (° C.) | 848 | 839 | 837 | 809 | 820 | 843 | 824 |
| SR inlet pressure (psig) | 6.0 | 6.0 | 5.8 | 2.1 | 3.6 | 12.6 | 19.1 |
| SR CH4 flowrate (SLPM) | 3.82 | 3.82 | 3.82 | 1.52 | 2.46 | 6.88 | 11.48 |
| SR steam flowrate (SLPM) | 7.73 | 7.73 | 7.73 | 3.12 | 4.99 | 13.84 | 23.06 |
| Molar Steam to Carbon Ratio | 2.02 | 2.02 | 2.02 | 2.05 | 2.03 | 2.01 | 2.01 |
| SR contact time (msec) | 10.7 | 10.7 | 10.7 | 26.7 | 16.6 | 6.0 | 3.6 |
| SR GHSV (per hour) | 335612 | 335612 | 335612 | 134737 | 216393 | 602044 | 1003795 |
| Average reactor temp. (° C.) | 834 | 850 | 840 | 854 | 838 | 854 | 858 |
| CH4 Conversion (GC Basis) (%) | 94.9 | 94.6 | 92.1 | 98.1 | 96.0 | 83.7 | 72.6 |
| Selectivity: CO (%) | 78.8 | 77.6 | 75.6 | 83.5 | 83.7 | 73.5 | 72.2 |
| SR pressure drop (psi) | 2.1 | 2.1 | 2.1 | 0.9 | 1.3 | 2.8 | 3.9 |
| SR pressure drop ($Pa/10^5$) | 1.2 | 1.2 | <1.2 | 1.1 | 1.1 | 1.2 | 1.3 |
| average heat flux ($W/cm^2$) | 12.9 | 12.8 | 12.4 | 5.4 | 8.5 | 20.2 | 29.2 |
| volumetric heat flux ($W/cm^3$) | 52.5 | 52.1 | 50.3 | 21.9 | 34.7 | 81.9 | 118.4 |

$NO_x$ measurements were made of the dry combustion effluent stream while testing the device of example 4 at the conditions shown under Test 2 in Table 5. The concentration of NO measured at this condition (4.7 SLPM $H_2$, 20 SLPM air, 850° C. body temperature) in the dry effluent was 10-12 ppm. This compares to $NO_x$ levels exceeding 100 ppm in conventional methane steam reformers. This measurement is called herein "the standard $NO_x$ test measurement."

Figure 22:
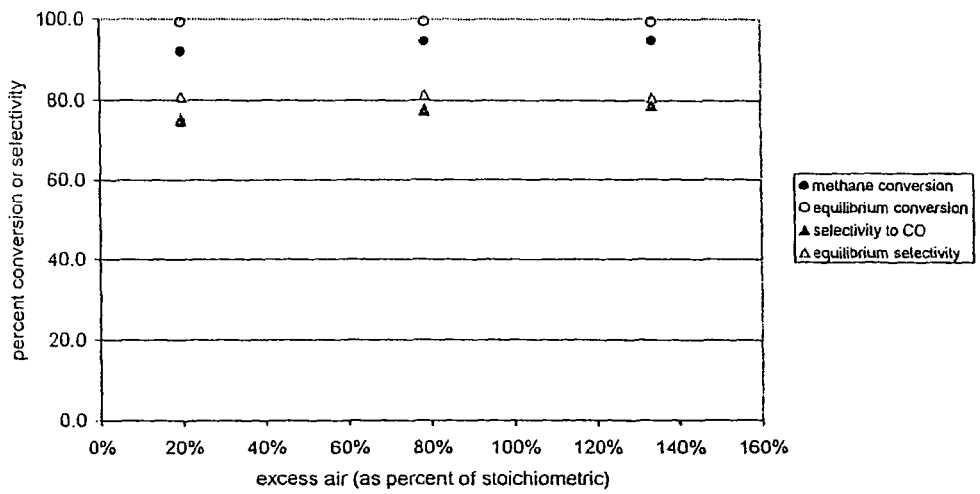
Figure 23:
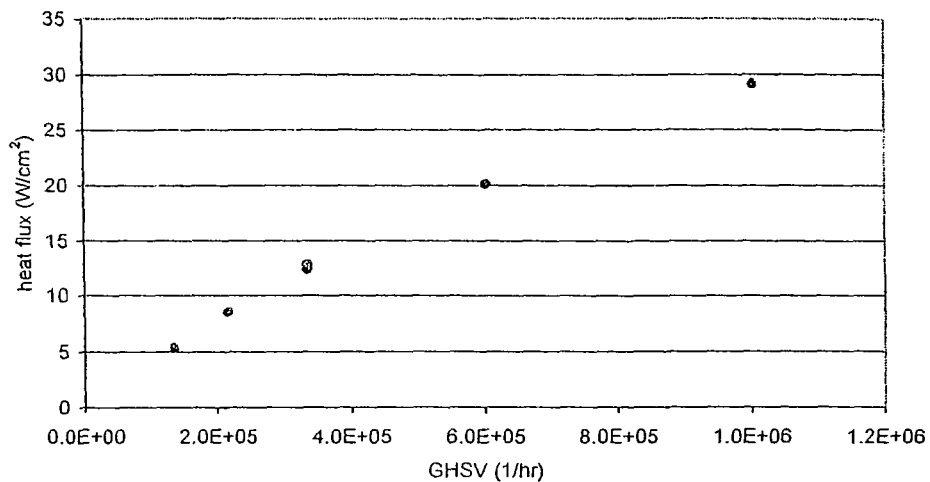
Figure 24:
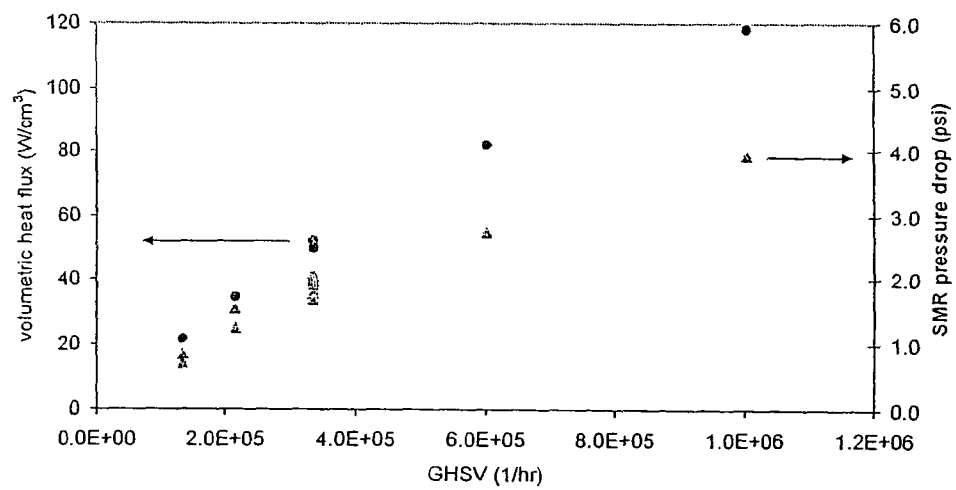

Results from tests in which the amount of excess air on the combustion side was varied show that the high heat-flux integrated combustion reactor is able to function effectively with 20% excess air (see FIG. 22). This means that the combustion air requirement and corresponding air compressor costs and air recuperation duty can be greatly reduced relative to traditional catalytic combustors.

The volumetric heat flux (i.e., the power transferred to the endothermic reaction per unit volume of reactor) reflects the compactness or degree of intensification of the process. The high volumetric heat flux values shown in FIG. 24 demonstrates the ability of this device to drive heat (circles, left axis) into the endothermic reaction with a greatly reduced reactor (and catalyst) volume and minimal pressure drop (triangles, right axis). The highest volumetric heat flux observed in the high heat-flux integrated combustion reactor (FIG. 24) is 200-1000 times higher than those typically seen in conventional reformers. The greatly reduced reactor vol-respectively, per a 1 inch reactor flow length. Near equilibrium methane conversions (73-98%) were achieved in this microchannel device for very high gaseous hourly space velocities ($1.3 \times 10^5$ to $1.0 \times 10^6$) at 2:1 steam:C, ~1 atm, and 850° C. average wall temperature. The high heat-flux microchannel reactor was shown to be able to operate with excess combustion air as low as 20%.

Example 5

An integrated-combustion microchannel reactor with distributed fuel injection and a cross-current reforming and combustion flow orientation was designed, fabricated, and demonstrated. This example describes the design and testing of this microchannel reactor. Combustion of hydrogen in air was used as the exothermic reaction, while steam methane reforming (SMR) with a steam to carbon ratio of 3:1 was used as the endothermic reaction. The device included a single SMR flow-by channel with three combustion flow-by channels flowing in a cross-current orientation relative to the SMR channel. SMR reactants flowed in a 0.13 mm gap between the wall and a layer of porous engineered catalyst which was in intimate thermal contact with the solid channel wall or heat transfer surface. Combustion air flowed in three parallel 2.5 mm cylindrical channels, each with combustion catalyst coated on the wall. At three points distributed evenly along the flow length of the combustion channels hydrogen fuel was injected into the combustion channel. Each combustion channel also contained a static mixer made from 0.5 mm notched and twisted inconel sheet material. The test results show that this cross-current integrated combustion device can obtain high heat fluxes (~15 W/cm$^2$). High conversions were also possible at very high space velocities.

Experimental Method

Figure 25:
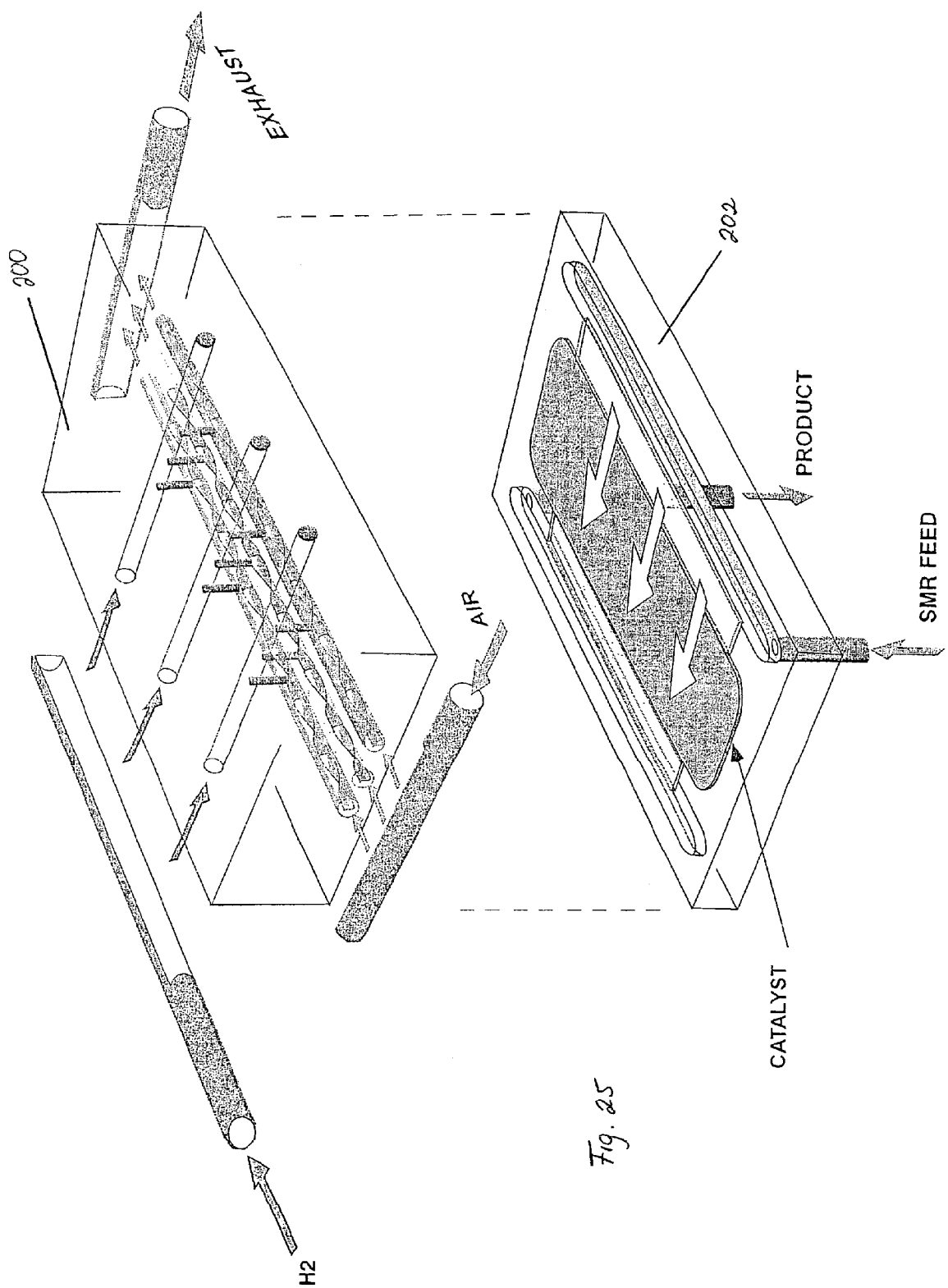
FIG. 25 illustrates a reactor design of a reactor described in the Examples.

A cross-current microchannel device with integrated combustion was designed, fabricated, and tested. The device body (see FIG. 25) was fabricated from Inconel 625 by using wire EDM and conventional machining to form both an SMR plate 202 (~0.6 cm thick) and a combustion plate 200 (1.1 cm thick), each roughly 2.3" by 1.2" (5.8 cm×3.0 cm). Engineered SMR catalyst was then placed inside the SMR channel between the plates and the two pieces were welded together to seal the device. Four raised regions, each 0.05" (1.3 cm) wide by 0.45" (1.1 cm) long were distributed evenly across the SMR channel to hold the catalyst against the wall (heat transfer surface). The SMR catalyst measured 1.5 inch by 0.45 inch by 0.011 inch thickness and were placed within a slot of equal dimension except the thickness of the slot was 0.016 inch. External cover plates containing the inlet and outlet gas manifolds (i.e. headers and footers) were independently machined and welded onto the body, except for the combustion fuel inlets, which were fed through three separate inlet tubes. The SMR header was designed to distribute the flow evenly across the 1.5" (3.8 cm) catalyst width before flowing into the 0.005" (0.013 cm) flow-by gap. Combustion air flowed in three 0.1" (0.3 cm) diameter cylindrical flow-by channels in a cross-current orientation relative to the SMR channel. Combustion air was mixed with hydrogen fuel, injected from the wall opposite the flowed in three parallel 2.5 mm cylindrical channels, each with combustion catalyst coated on the wall. At three points distributed every 0.5" (0.13 cm) along the flow length of each combustion channel hydrogen fuel was injected into the combustion channel through 0.012" (0.0030 cm) holes. A static mixer made from 0.5 mm notched and twisted inconel sheet material was inserted inside each combustion channel which enhanced mixing of the air and fuel within each channel. Combustion catalyst was coated on the static mixer and the wall of the combustion channels to promote catalytic combustion of the fuel/air mixture. During testing, the device was insulated with ceramic fiber insulation.

Gaseous reactants were metered from pressurized cylinders via Brooks mass flow controllers, while water was delivered via high pressure liquid (HPLC) pump. An external combustor and heat exchange network was used to continuously vaporize the feed water, preheat the steam reforming reactants combustion air to the values shown in the Table below. Device body temperatures were measured in thermowells (drilled into the outside of the combustion plate) using 0.032" type K thermocouples and recorded by Labview with a data logging system. Inlet and outlet gas pressures were measured for the combustion and reforming streams via calibrated pressure transducers. Gas temperatures were also measured via thermocouple at the combustion gas inlet and outlet and at the reformer gas inlet and outlet. The product gases were cooled in water-cooled condensers and the dry exit volumetric flow was measured in a dry test meter. Dry product gas compositions ($H_2$, CO, $CO_2$, $CH_4$, $O_2$, and $N_2$) were measured using an online MTI GC. SMR performance was evaluated using a 2:1 molar steam to carbon ratio. Gaseous hourly space velocity (GHSV) was calculated based on the entire channel volume within which flow was exposed to catalyst (including the catalyst, spacer strips, and flow-by volume) based on volumetric flows defined at 0° C. and 1 atm. Average heat flux was calculated based on the entire wall area in contact with SMR catalyst and adjacent to plane beneath the combustion cylinders, therefore defining the plane through which heat is transferred between fluids.

Catalysts were reduced during the first day of testing at 125° C. for 1 hour. Startup of the small superchannel was accomplished in several steps. First nitrogen flow was started in the SMR side and air flow was initiated in the combustion side. Hydrogen was then introduced to the combustion channels as about 3% of the total flow, causing catalytic ignition of the combustion reactants. Next the hydrogen content was slowly ramped up to bring the reactor temperature to about 400° C. Then a small hydrogen flow was introduced into the reforming channels to prevent catalyst oxidation by steam, and water was fed through the vaporizer, thus providing steam to the reforming channels. Finally, the reformer nitrogen was turned off, methane was introduced into the reformer, and the reformer hydrogen turned off. Once the reforming reaction began, additional hydrogen was fed to the combustion channels to maintain the reactor body temperature between 725 and ~875° C. Changes in process flows made during steady-state operation were performed in a balanced fashion (changing both the reforming and combustion flows at the same time) to prevent large transient deviations of the temperature from the desired operating temperature. To aid in the analysis of hydrogen conversion, a quenching steam at about 400° C. was sometimes injected directly into the combustion footer. This was not very effective at quenching the combustion in the footer of the device, and significantly increased the thermal losses when used.

Results and Discussion

Figure 26:
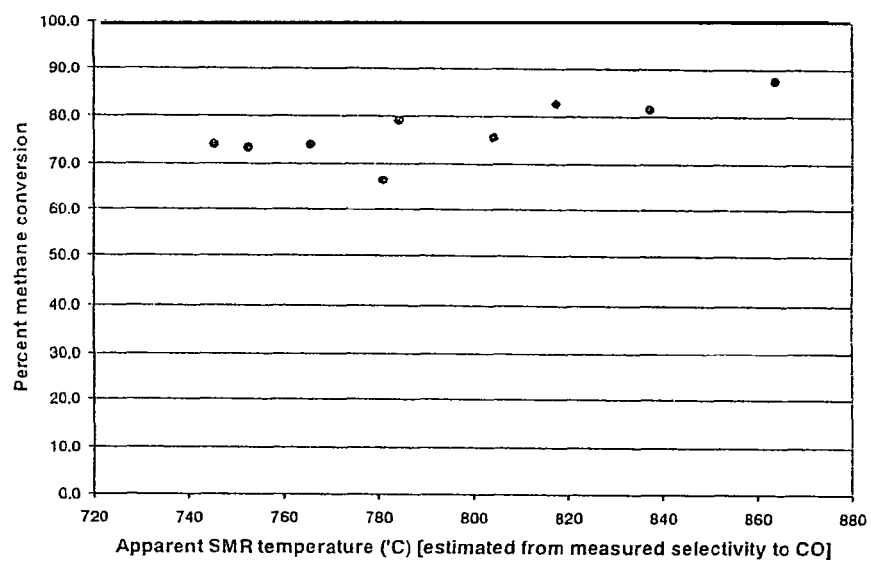
FIGS. 26-27 are data from the Examples.

Results of tests using the cross-flow integrated combustion microchannel reactor are shown in the Table below and FIG. 26. Important features demonstrated include: catalyst applied directly to wall; static mixer inserted into reaction chamber; distributed fuel; and cross-flow orientation of combustion fluids and reformate.

TABLE

Summary of best results of tests using ICR device of Ex. 5

| | | | |
|---|---|---|---|
| CR inlet temperature (° C.) | 799 | 799 | 776 |
| CR inlet pressure (psig) | 6.43 | 10.94 | 4.83 |
| CR inlet pressure (Pa/10$^5$) | 1.5 | 1.8 | 1.3 |
| CR fuel inlet temperature (° C.) | 25 | 25 | 25 |
| H2 flow row 1 (SLPM) | 0.36 | 0.36 | 0.30 |
| H2 flow row 2 (SLPM) | 0.36 | 0.36 | 0.30 |
| H2 flow row 3 (SLPM) | 0.36 | 0.36 | 0.30 |
| air flow rate (SLPM) | 9.0 | 14.4 | 5.2 |

TABLE-continued

Summary of best results of tests using ICR device of Ex. 5

| | | | |
|---|---|---|---|
| 400 C quench steam flow (SLPM) | 21.1 | 21.1 | 14.9 |
| % excess air | 250% | 460% | 143% |
| CR contact time (msec) | 1.15 | 0.75 | 1.90 |
| SR GHSV (per hour) | 3132777 | 4811051 | 1895827 |
| air pressure drop (psi) | 1.1 | 1.3 | 0.5 |
| air pressure drop (Pa/$10^5$) | 1.1 | 1.1 | 1.0 |
| H2 Conversion (GC basis) (%) | 99.9% | 99.9% | 99.9% |
| SR inlet temperature (° C.) | 817 | 807 | 825 |
| SR inlet pressure (psig) | 14.3 | 13.9 | 14.7 |
| SR inlet pressure (Pa/$10^5$) | 2.0 | 2.0 | 2.0 |
| SR CH4 flow (SLPM) | 0.53 | 0.53 | 0.53 |
| SR steam flow (SLPM) | 1.59 | 1.59 | 1.59 |
| Molar Steam to Carbon Ratio | 3.0 | 3.0 | 3.0 |
| SR contact time (msec) | 5.0 | 5.0 | 5.0 |
| SR GHSV (per hour) | 720670 | 720670 | 720670 |
| Average IC body temperature (° C.) | 856 | 844 | 856 |
| Apparent SMR temperature (° C.) | 766 | 753 | 837 |
| CH4 Conversion (GC Basis) (%) | 73.8 | 73.3 | 81.1 |
| Selectivity: CO (%) | 62.2 | 61.2 | 67.2 |
| SMR pressure drop (psi) | 10.8 | 10.3 | 11.3 |
| SMR pressure drop (Pa/105) | 1.8 | 1.7 | 1.8 |
| SMR heat flux (W/cm^2): | 13.6 | 13.9 | 16.5 |
| Heat load per unit volume (reactor zone) (W/cm3) | 34.0 | 34.8 | 41.3 |

For all tests the conversion of hydrogen in the combustion reaction chamber was 100%

Example 6

Design and Operation

An integrated reforming and combustion reactor was evaluated in a cross-flow orientation. A single SMR slot was adjacent to three combustion cylinders.

The SMR engineered catalyst was placed against the wall shared with the combustion channels, which provides the energy supplying the endothermic reforming reaction. The SMR channel gap was 0.015 inches and an SMR porous engineered catalyst of 0.012 inches was inserted leaving a gap of 0.003 inches. The length of this reforming channel was 0.45 inches and the width was 0.5 inches. The combustion section was made up of three 0.100" (0.254 cm) diameter channels in a plane parallel with the SMR channels, but with its flow path aligned 90° to the flow of the SMR channel, in cross-flow fashion. There was a 0.05 inch web of metal separating the reforming channel and the top of the combustion cylindrical channels. The flow length of the combustion cylinders was 0.5 inches which matched with the 0.5 inch width of the reforming channel for this cross-flow orientation. The combustion catalyst was made from a 0.010" (0.025 cm) thick FeCrAlY felt wrapped around a 0.060" (0.15 cm) wide and 0.020" (0.051 cm) thick static mixer insert. The mixer served two functions: (1) pressing the felt against the chamber walls and (2) mixing the fuel as the air passed through the inner diameter of the felt. The static mixer was made in the following manner:
1. The 0.060" wide side was cut into two 0.250" length sections separated by a 0.020" width that extended 0.040" in length.
2. The first 0.250" length section was twisted 90° from its beginning orientation
3. The next (and last) 0.250" length section's beginning was turned 90° to the end of the first 0.250" length section.
4. The end of the second 0.250" long length was twisted 90° in the opposite direction of the first 0.250" length section.

The fuel is fed into each combustion channel at the inlet of the cylindrical channel from the bottom of the device, or on the side opposite the plane that separates the reforming channel. Combustion fuel enters 0.030" (0.076 cm) ahead of the catalyst/static mixer insert placed within the combustion cylindrical channel, each channel with it own fuel port.

The overall dimensions of the block device in the plane of the channels are 1.65" across in the SMR channel direction and 1.700" in the combustion channel direction, centered over the 0.450" by 0.500" integrated combustion reforming core where the reactions occur and heat is transferred. The volume through which all heat is transferred and used for volumetric heat flux calculations is 0.45 inches by 0.5 inches by the sum of 0.1 inch (combustion diameter) and 0.05 inch (metal web separating channels) and 0.015 inches (full reforming channel) for a total of 0.037 in3 or 0.6 cm3. The area or plane through which all heat is transferred is 0.45 inches by 0.5 inches or 1.45 cm². The process header was specially made to have a smooth transition from the inner diameter of a 0.180" inner diameter inlet tube to the 0.500" wide by 0.014" tall slit to avoid coking and allow additional pre-heating from device losses. A footer of the same design leads to the outlet tube of 0.180" inner diameter.

This steam methane reforming microchannel reactor supported a pressure differential of 11 atm absolute at 850 C between reforming and combustion channels. The metal web separating channels was 1.27 mm or 1270 microns. The device was operated for more than 13 days or more than 300 hours without any change in structural integrity. No leaks were found between streams. The high pressure differential between streams was supported over a thin metal web by the use of microchannel, especially circular microchannels, beneath a high pressure reforming slot.

Performance

Figure 27:
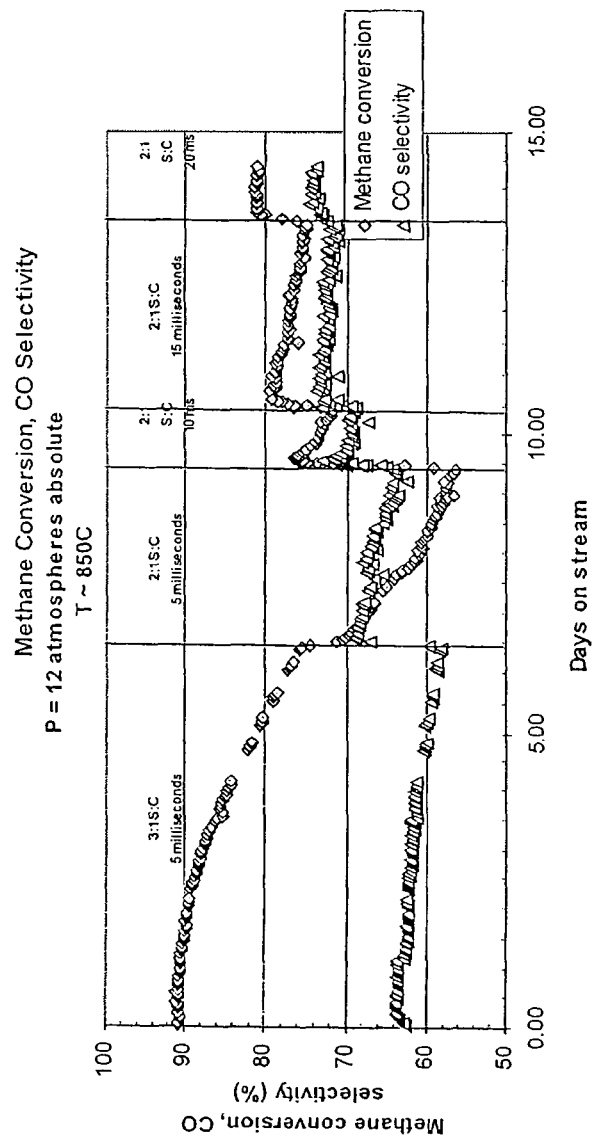

The device was demonstrated for the reforming reaction at 3:1 molar steam to carbon ratio, 12 atmospheres absolute pressure and 850° C., and 5 milliseconds contact time. The device produced equilibrium conversion, as seen in FIG. 27. The methane conversion and CO selectivity decreased continuously over time for the next five and a half days. The conditions were changed to 2:1 molar steam to carbon, with the temperature, pressure and contact time held constant, and the loss of activity continued. This device did show substantial heat fluxes and average volumetric heat fluxes, as shown in Table 5. The first two settings refer to the 3:1 steam to carbon ratio at 5.0 millisecond contact times, with setting #1 referring to the beginning of the run in FIG. 27 and setting #2 referring to the end of the run. Similarly, settings #3 and #4 in the Table below refer to the beginning and end performance of the 2:1 steam to carbon molar ratio at 5 milliseconds contact time, also illustrated in FIG. 27. All data reflect an SMR reactant inlet temperature of 830 to 840 degrees Celsius.

TABLE 5

| Setting # | Methane flow rate (SLPM) | Water flowrate (ccm) | Inlet pressure (Psig) | Total Process dP (psid) | Methane Conversion % | CO Selectivity (%) | Total heat load (W) | Average heat flux (W/cm²) | Average volumetric heat flux (W/cm³) |
|---|---|---|---|---|---|---|---|---|---|
| 1 | 0.153 | 0.37 | 174.3 | 2.75 | 91 | 63.83 | 22.2 | 15.3 | 43.1 |
| 2 | 0.153 | 0.37 | 174.5 | 2.65 | 75.4 | 58.1 | 18.2 | 12.6 | 35.3 |
| 3 | 0.206 | 0.33 | 174.6 | 2.73 | 70.1 | 68.9 | 23.2 | 16.0 | 45.0 |
| 4 | 0.206 | 0.33 | 173.7 | 2.74 | 56.5 | 64.4 | 18.6 | 12.8 | 36.0 |

The corresponding settings on the combustion side to those in Table 5 are shown in Table 6. They reflect a constant air flow rate of 5.4 SLPM for three channels, and a fairly constant hydrogen flow rate near 0.5 SLPM.

TABLE 6

| Setting # | Hydrogen flow rate (SLPM) | Air flow rate (SLPM) | Air inlet temp (Celsius) | Excess Air (%) | Adiabatic Flame Temp (Celsius) |
|---|---|---|---|---|---|
| 1 | 0.506 | 5.4 | 817 | 348 | 1450 |
| 2 | 0.508 | 5.4 | 771 | 347 | 1411 |
| 3 | 0.514 | 5.4 | 768 | 342 | 1412 |
| 4 | 0.514 | 5.4 | 788 | 341 | 1432 |

For all tests, the conversion of hydrogen in the combustion reaction chamber was 100%.

Heat Flux Measurement Test

Operate the device for a methane steam reforming reaction at 850 C, 1.70 bar (10 psig), 3:1 steam to carbon ratio, and a contact time of 100 ms. Contact time is defined as the total reaction volume divided by the total volumetric inlet flowrate of reactants at standard temperature and pressure (STP: 273K and 1 atm absolute). The total reaction volume is inclusive of the steam reforming catalyst and the reaction channel volume that contains the catalyst.

For example, if the cumulative volumetric sum of reaction chambers inclusive of reforming catalysts is 1 cubic centimeter, then the inlet total flowrate of reactants would be 0.6 standard liters per minute. The inlet flowrate of methane would be 0.15 standard liters per minute and the inlet flowrate of steam would be calculated to be 0.45 liters per minute at standard temperature and pressure. For this example, the inlet molar flowrate of methane would be roughly 0.00045 moles per second. These numbers scale linearly with the total reaction chamber volume. A 2 cubic centimeter reaction chamber volume would require 0.0009 moles per second.

Methane conversion is determined by measuring the outlet product composition and the outlet flowrate of methane reforming reaction products and then calculating based on the following formula.

Conversion %=100×(moles methane in−moles methane out)/(moles methane in)

Moles methane in=inlet flowrate of methane at STP/(22.4 L/mol)

Moles methane out=[outlet flowrate of total product dry gas/(22.4 L/mol)]×% methane in dry gas GC analysis Dry gas is defined as the product gas stream flowrate after condensing the unreacted water or other condensable fluids.

Selectivity to CO %=100×(moles of CO/(moles of CO2+moles of CO+moles of C(s) if present))

Selectivity to CO2%=100×(moles of CO2/(moles of CO2+moles of CO+moles of C(s) if present))

Heat load=(Conversion %/100)×Moles methane in ×(Heat of reaction of steam reforming to carbon monoxide at 850 C (226800 J/mol)×selectivity to CO %+Heat of reaction of steam reforming of methane to carbon dioxide at 850 (193200 J/mol)×selectivity to CO2%)/100, units of Watts Heat flux=Heat load/reactor core volume, units of Watts/cm3

Where the reactor core volume includes all reaction chambers or channels, all associate combustion chambers or channels, and all separating metal webs through which heat transfers between fluids. In short, this volume includes the total volume through which heat transfers for the methane steam reforming reaction. This volume does not include perimeter metal, manifold volume, or other associated packaging that is dependent on individual device geometries.

The following conditions must be met for the combustion reaction that supplies heat for the heat flux measurement test:

1. The gas phase fuel that must be used is hydrogen.
2. The total air flow rate is sized such that a mixture of the hydrogen and air flow rates into the reactor reaches an excess air percentage of 80%. The excess air is defined as the total molar flow rate of oxygen in the combination of hydrogen and air divided by the molar flow rate of oxygen needed to fully oxidize the hydrogen at its molar fuel flow rate. As one mole of oxygen can fully oxidize two moles of hydrogen, 80% excess air corresponds to a 4.28:1 molar ratio of air to hydrogen. Air is taken as 21% mole percent oxygen, balance nitrogen.
3. The hydrogen and air enter the combustion reactor at 900° C.
4. The air and hydrogen are to be mixed either in a manifold that is directly upstream of the combustion reactor or in the reactor itself.
5. The standard volumetric flow rates for hydrogen through the combustion reactor per 0.15 SLPM of methane flow rate through the methane steam reforming reactor is a minimum of 0.140 SLPM and a maximum of 0.204 SLPM.
6. The corresponding minimum and maximum air flow rates through the combustion reactor, based upon the 80% excess air condition, per 0.15 SLPM of methane flow rate through the methane steam reforming reactor is 0.600 SLPM and 0.875 SLPM, respectively.

7. The inlet pressures of the hydrogen and air streams should be no greater than 2.38 bar (20 psig).

Pressure Test—High Temperature Test for ICR

In preferred embodiments, any of the devices described herein are capable of withstanding internal pressure differences. For example, some preferred embodiments meet the requirements of the following pressure test. For a microchannel unit operation device with at least one critical channel dimension less than about 2 mm, operate with at least two inlet fluid streams. The first fluid stream must be at 850 C and 180 psig. The second fluid stream must be at 800 C and 10 psig. Any flow rate may be used. Operate the device with gas flow to both streams for 300 hours. After 300 hours operation, pressurize each fluid flow line to 50 psig and hold for 2 hours. The pressure must remain constant indicating minimal leak paths to the environment. Then, pressurize the second fluid flow line to 50 psig, leaving the first fluid flow line open to atmosphere, and hold for 2 hours. The pressure must remain constant indicating minimal internal leak paths. A minimal leak path is defined as a leak rate of less than $10^{-6}$ standard cubic centimeters per second of helium when helium is used as the fluid for the final leak test.

The invention also includes methods of conducting unit operations in the device having the pressure resistance characteristic described above.

We claim:

1. An integrated reactor, comprising:
   alternating layers of exothermic and endothermic reaction chambers, comprising at least 2 layers of endothermic reaction chambers alternating with at least one layer comprising an exothermic reaction chamber;
   wherein the exothermic reaction chamber comprises an exothermic reaction catalyst;
   wherein the endothermic reaction chambers comprise an endothermic reaction catalyst;
   wherein the exothermic reaction chamber comprises a wall that is adjacent at least one of the endothermic reaction chambers;
   wherein the endothermic reaction catalyst comprises a porous catalyst insert that can be conveniently inserted and removed from the endothermic reaction chamber;
   and wherein the integrated reactor possesses a volumetric heat flux characteristic of at least 1 W/cc as measured according to the Volumetric Heat Flux Measurement Test.

2. The reactor of claim 1 wherein the porous catalyst insert fills the endothermic reaction chamber.

3. The reactor of claim 2 wherein the integrated reactor possesses a volumetric heat flux characteristic of 1 W/cc to 120 W/cc as measured according to the Volumetric Heat Flux Measurement Test.

4. The reactor of claim 2 wherein the integrated reactor possesses a volumetric heat flux characteristic of 10 W/cc to 120 W/cc as measured according to the Volumetric Heat Flux Measurement Test.

5. The reactor of claim 1 wherein the exothermic reaction chamber comprises multiple apertures along its length adapted for staged introduction of fuel or oxidant into the exothermic reaction chamber.

6. The reactor of claim 5 wherein the integrated reactor possesses a volumetric heat flux characteristic of 1 W/cc to 120 W/cc as measured according to the Volumetric Heat Flux Measurement Test.

7. The reactor of claim 5 wherein the integrated reactor possesses a volumetric heat flux characteristic of 10 W/cc to 120 W/cc as measured according to the Volumetric Heat Flux Measurement Test.

8. The reactor of claim 1 wherein the wall comprises steel, or high temperature nickel based superalloy.

9. The reactor of claim 8 wherein the integrated reactor possesses a volumetric heat flux characteristic of 10 W/cc to 120 W/cc as measured according to the Volumetric Heat Flux Measurement Test.

10. The reactor of claim 9 wherein the integrated reactor possesses a $NO_x$ output of less than 100 ppm as measured according to the standard $NO_x$ test measurement.

11. The reactor of claim 9 wherein the integrated reactor possesses a $NO_x$ output in the range of about 5 to 20 ppm as measured according to the standard $NO_x$ test measurement.

12. The reactor of claim 9 wherein the integrated reactor possesses a $NO_x$ output in the range of about 5 to 100 ppm as measured according to the standard $NO_x$ test measurement.

13. The reactor of claim 1 wherein the integrated reactor possesses a volumetric heat flux characteristic of 1 W/cc to 120 W/cc as measured according to the Volumetric Heat Flux Measurement Test.

14. The reactor of claim 13 wherein the integrated reactor possesses a $NO_x$ output of less than 100 ppm as measured according to the standard $NO_x$ test measurement.

15. The reactor of claim 13 wherein the integrated reactor possesses a $NO_x$ output in the range of about 5 to 20 ppm as measured according to the standard $NO_x$ test measurement.

16. The reactor of claim 1 wherein the integrated reactor possesses a volumetric heat flux characteristic of 10 W/cc to 120 W/cc as measured according to the Volumetric Heat Flux Measurement Test.

* * * * *